US010230906B2

(12) United States Patent
Topfer et al.

(10) Patent No.: US 10,230,906 B2
(45) Date of Patent: Mar. 12, 2019

(54) BEAM DETECTION WITH CONTINUOUS DETECTOR READOUT

(71) Applicant: CARESTREAM HEALTH, INC., Rochester, NY (US)

(72) Inventors: Karin Topfer, Rochester, NY (US); Jeffery R. Hawver, Marion, NY (US); Eric M. Welch, Avon, NY (US)

(73) Assignee: Carestream Health, Inc., Rochester, NY (US)

( * ) Notice: Subject to any disclaimer, the term of this patent is extended or adjusted under 35 U.S.C. 154(b) by 40 days.

(21) Appl. No.: 15/525,607

(22) PCT Filed: Dec. 9, 2015

(86) PCT No.: PCT/US2015/064683
§ 371 (c)(1),
(2) Date: May 10, 2017

(87) PCT Pub. No.: WO2016/094503
PCT Pub. Date: Jun. 16, 2016

(65) Prior Publication Data
US 2017/0374295 A1 Dec. 28, 2017

Related U.S. Application Data

(60) Provisional application No. 62/090,400, filed on Dec. 11, 2014.

(51) Int. Cl.
*H04N 5/32* (2006.01)
*H04N 5/361* (2011.01)
*G01T 1/16* (2006.01)
*H04N 5/359* (2011.01)

(52) U.S. Cl.
CPC ............. *H04N 5/32* (2013.01); *H04N 5/3597* (2013.01); *H04N 5/361* (2013.01); *G01T 1/16* (2013.01)

(58) Field of Classification Search
CPC ........ H04N 5/32; H04N 5/3597; H04N 5/361; G01T 1/16
See application file for complete search history.

(56) References Cited

U.S. PATENT DOCUMENTS

| 5,818,898 A | 10/1998 | Tsukamoto et al. |
| 2014/0061495 A1 | 3/2014 | Yagi et al. |

FOREIGN PATENT DOCUMENTS

| EP | 2 403 237 A1 | 1/2012 |
| EP | 2 614 772 A1 | 7/2013 |

OTHER PUBLICATIONS

International Search Report dated Mar. 16, 2016 for International Patent Application No. PCT/US2015/064683, 2 pages.

*Primary Examiner* — Mark R Gaworecki

(57) ABSTRACT

A method of operating a DR detector including sequentially capturing image frames in the detector that include at least one dark image. The dark image is stored and a statistical measure for a subset of pixels in a captured image frame is compared with the same statistical measure of a subset of pixels in the stored dark image to detect an x-ray beam impacting the detector. An x-ray beam-on condition is indicated if a sufficient difference in intensity between the pixel subsets is detected. At least one more image frame is captured in the detector after detecting the x-ray beam. The current captured image and the at least one more image frame are added and the dark image is subtracted to form the exposed radiographic image.

19 Claims, 21 Drawing Sheets

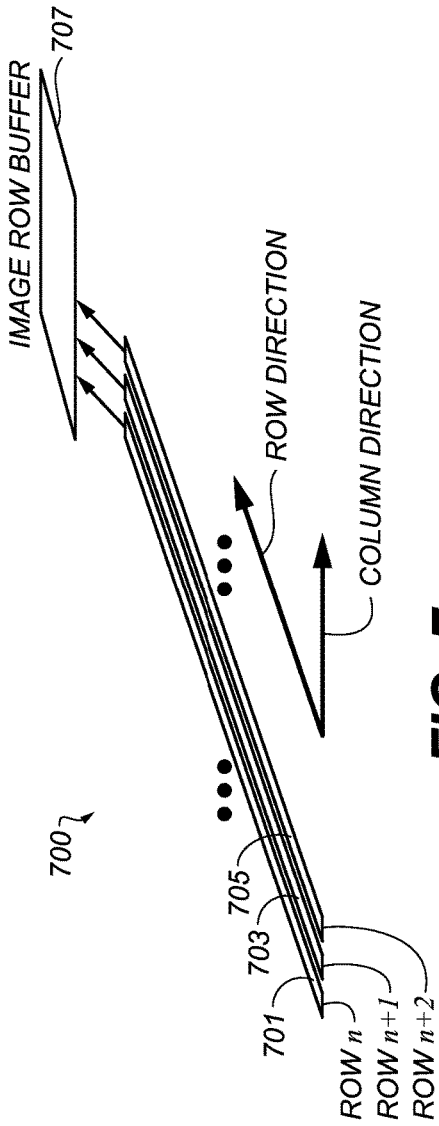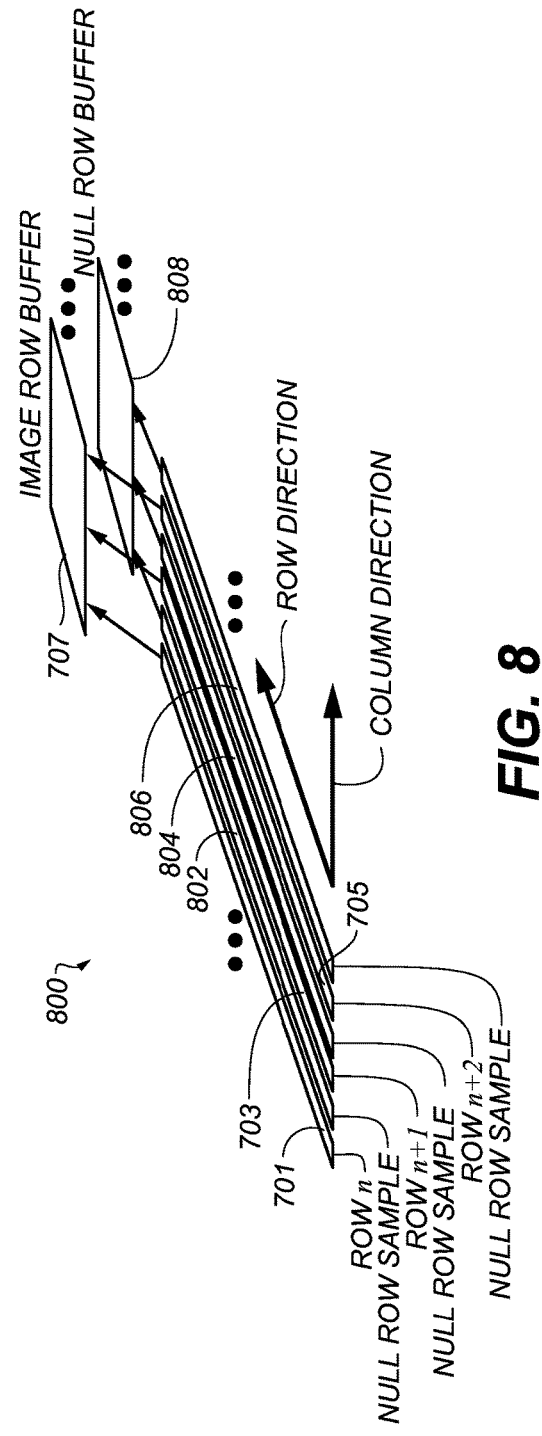

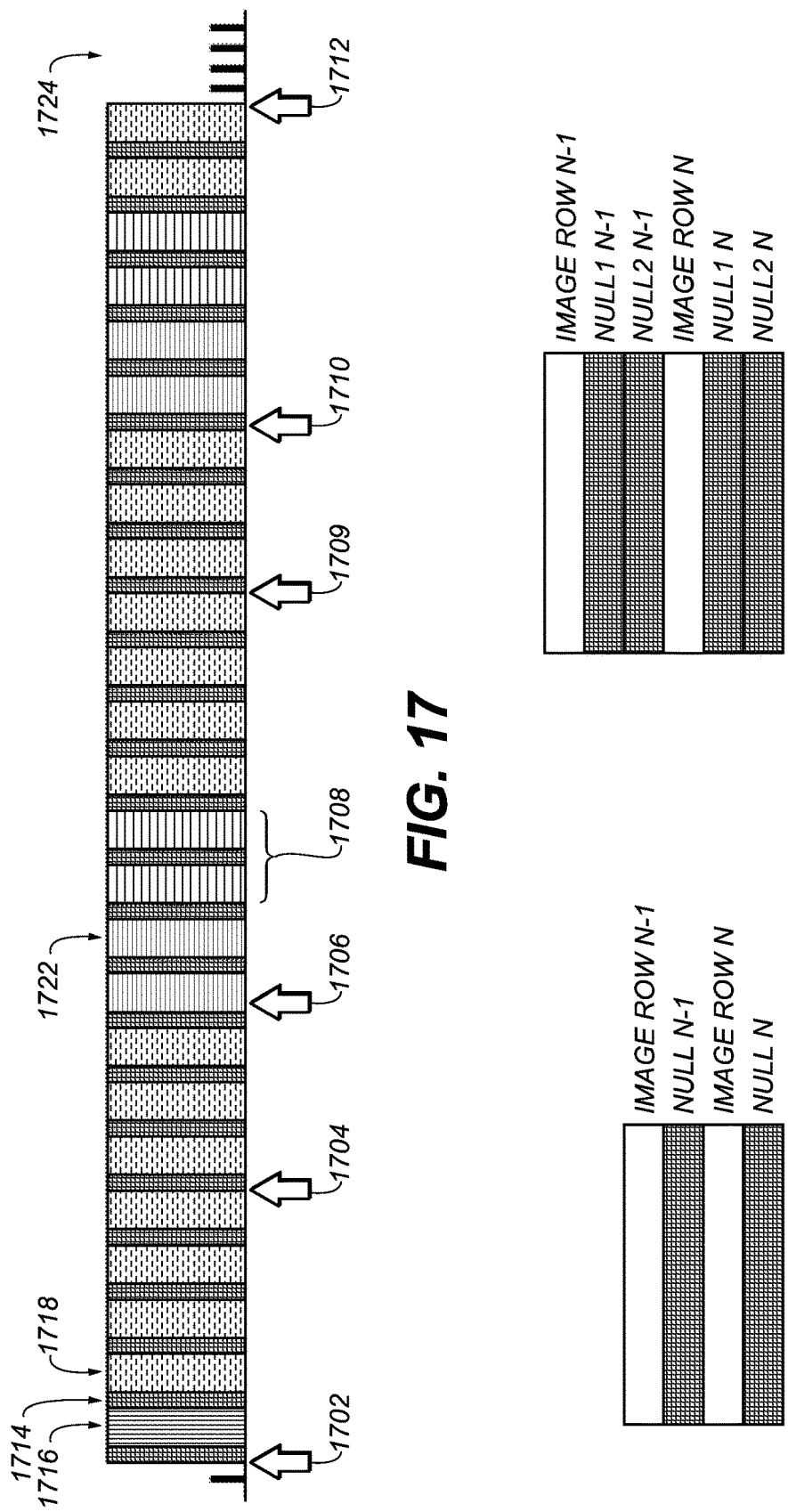

BEAM DETECTION WITH CONTINUOUS DETECTOR READOUT

CROSS REFERENCE TO RELATED APPLICATIONS

This application claims the benefit of and is a U.S. National Phase filing of PCT Application PCT/US2015/064683 filed Dec. 9, 2015 entitled "BEAM DETECTION WITH CONTINUOUS DETECTOR READOUT", in the name of Karin Topfer et al, which claims benefit of U.S. Provisional application U.S. Ser. No. 62/090,400, provisionally filed on Dec. 11, 2014, entitled "BEAM DETECTION WITH CONTINUOUS DETECTOR READOUT", in the name of Karin Topfer et al, all of which are incorporated herein in their entirety.

BACKGROUND OF THE INVENTION

The subject matter disclosed herein relates to radiographic imaging, in particular, to a digital radiographic detector utilizing a continuous readout mode of operation.

It may be desirable to run wireless, portable digital X-ray detectors without any wired connections between the detector and the X-ray generator or the host computer, which manages the image acquisitions and the generator. One method for such a simplified interface is to continuously read out the detector and detect beam turn-on based on the content of the images, and then add all frames which contain image information. A critical part of this concept is the reliable real-time detection of when the beam-on and beam-off events occurred. A number of dark images may be captured and averaged. A current image frame may be compared line by line with the cumulative averages of dark images, and if a difference threshold between them is exceeded, beam-on is established. However, for tightly collimated images, the signal in the image area may be low enough such that the beam-on may not be detected in every case.

In other instances, external electromagnetic interference and other noise sources may cause an increase in row noise which can cause false triggers. Missed or false beam-on and beam-off events would have the following consequences. If the beam-on event is detected one frame late, some image information is potentially missed, which may cause image artifacts and require a re-take of the X-ray image. False triggers for the beam on event create a nuisance for the operator and might temporarily disable image captures. If the beam off event is detected one frame too early some image information is potentially missed, which may also cause image artifacts and require a re-take of the X-ray image. If the beam off event is completely missed, this can be mitigated by a time out but the image access time increases.

Neither of these conditions is desirable, which requires that the algorithms for beam-on and beam-off detection be as robust as possible, while still allowing real-time processing on the detector. Another problem with beam detection by continuous readout is that there is some additional dark signal in the images during the period, when the beam is on. This is caused by parasitic capacitance between the photodiodes and the data line as explained herein.

The discussion above is merely provided for general background information and is not intended to be used as an aid in determining the scope of the claimed subject matter.

BRIEF DESCRIPTION OF THE INVENTION

A method of operating a DR detector including sequentially capturing image frames in the detector that include at least one dark image. The dark image is stored and a statistical measure for a subset of pixels in a captured image frame is compared with the same statistical measure of a subset of pixels in the stored dark image to detect an x-ray beam impacting the detector. An x-ray beam-on condition is indicated if a sufficient difference in intensity between the pixel subsets is detected. At least one more image frame is captured in the detector after detecting the x-ray beam. The current captured image and the at least one more image frame are added and the dark image is subtracted to form the exposed radiographic image.

In one embodiment, a method of operating a DR detector includes capturing image frames in the detector including at least one dark image frame and storing the dark image frame if only one is captured, or storing an average dark image frame if more than one dark image frame is captured. An x-ray beam impacting the detector is detected if pixels in a current captured image frame have captured image data having a greater intensity by a sufficient margin over the intensity of the dark image frame or the average dark image frame, as determined by a selected statistical measure. If the x-ray beam is determined to be detected, then at least one more image frame is captured in the detector. The current captured image frame and the at least one more image frame are added and the stored dark image frame is subtracted to form an exposed radiographic image frame.

In another embodiment, a method of operating a DR detector includes capturing image frames in the detector including capturing at least one dark image frame and storing an average dark image frame in the detector. If only one dark image frame is captured it becomes the average dark image frame. To detect when an x-ray beam impacts the detector, a statistical measure for a subset of pixels in a current captured image frame is compared with the same statistical measure for a subset of pixels in the stored dark image frame. The current captured image frame is determined to be an x-ray exposure image frame comprising x-ray exposure information if an intensity difference as between the dark image frame and the current captured image frame surpasses a programmed threshold. After determining that an x-ray source is active and generating exposure images, the detector continuously captures image frames having exposure information. A final image frame containing exposure information is detected by comparing an intensity of pixels in a current captured image frame with an intensity of pixels in an immediately preceding captured image frame. If an intensity difference in the current captured image frame falls below a predetermined threshold as compared to the immediately preceding captured image frame, the current captured image frame is determined to be the final image frame containing exposure information. All image frames containing exposure information are then added and the average dark image frame is subtracted to form an exposed radiographic image frame.

In another embodiment, a DR detector comprises an on-board image processing unit to execute stored instructions which cause the DR detector to perform the steps of the methods described herein.

The summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The drawings below are intended to be drawn neither to any precise scale with respect to relative size, angular relationship, relative position, or timing relationship, nor to any combinational relationship with respect to interchangeability, substitution, or representation of a required implementation.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 7 is a diagram showing an exemplary readout process for an image readout operation in a DR detector.

FIG. 8 is a diagram showing an exemplary image readout process using an interleaved null row read process for a DR detector.

FIG. 17 illustrates exemplary DR detector integration and readout cycles.

FIGS. 18A-B illustrate illustrates image and null row read cycles.

DETAILED DESCRIPTION OF THE INVENTION

Figure 1:
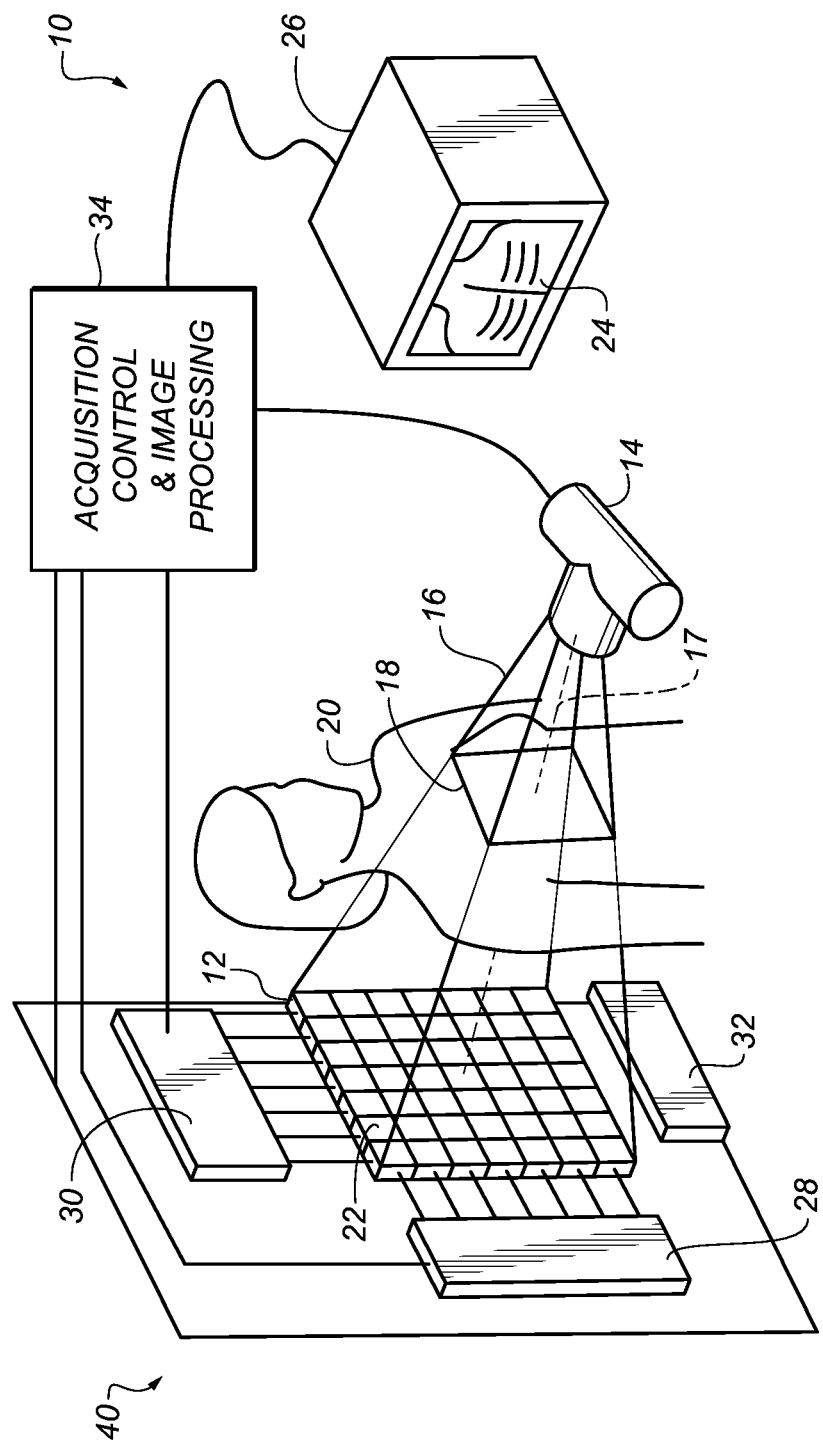
FIG. 1 is a perspective view of an exemplary radiographic imaging system.

FIG. 1 is a perspective view of a digital radiographic (DR) imaging system 10 that includes a generally planar DR detector 40 (shown without a housing for clarity of description), an x-ray source 14 configured to generate radiographic energy (x-ray radiation), and a digital monitor 26 configured to display images captured by the DR detector 40, according to one embodiment. The DR detector 40 may include a two dimensional array 12 of detector cells 22 (photosensors), arranged in electronically addressable rows and columns. The DR detector 40 may be positioned to receive x-rays 16 passing through a subject 20 during a radiographic energy exposure, or radiographic energy pulse, emitted by the x-ray source 14. As shown in FIG. 1, the radiographic imaging system 10 may use an x-ray source 14 that emits collimated x-rays 16. e.g. an x-ray beam, selectively aimed at and passing through a preselected region 18 of the subject 20. The x-ray beam 16 may be attenuated by varying degrees along its plurality of rays according to the internal structure of the subject 20, which attenuated rays are detected by the array 12 of photosensitive detector cells 22. The planar DR detector 40 is positioned, as much as possible, in a perpendicular relation to a substantially central ray 17 of the plurality of rays 16 emitted by the x-ray source 14. The array 12 of individual photosensitive cells (pixels) 22 may be electronically read out (scanned) by their position according to column and row. As used herein, the terms "column" and "row" refer to the vertical and horizontal arrangement of the photosensor cells 22 and, for clarity of description, it will be assumed that the rows extend horizontally and the columns extend vertically. However, the orientation of the columns and rows is arbitrary and does not limit the scope of any embodiments disclosed herein. Furthermore, the term "subject" may be illustrated as a human patient in the description of FIG. 1, however, a subject of a DR imaging system, as the term is used herein, may be a human, an animal, an inanimate object, or a portion thereof.

In one exemplary embodiment, the rows of photosensitive cells 22 may be scanned one or more at a time by electronic scanning circuit 28 so that the exposure data from the array 12 may be transmitted to electronic read-out circuit 30. Each photosensitive cell 22 may independently store a charge proportional to an intensity, or energy level, of the attenuated radiographic radiation, or x-rays, received and absorbed in the cell. Thus, each photosensitive cell, which may be referred to herein as an "imaging pixel" or simply "pixel" as the context may indicate, when read-out, provides exposure intensity information, or a datum, defining a pixel of a radiographic image 24, e.g. a brightness level or an amount of energy absorbed by the pixel, that may be digitally decoded by acquisition control and image processing electronics 34 and transmitted to be displayed by the digital monitor 26 for viewing by a user. An electronic bias circuit 32 is electrically connected to the two-dimensional detector array 12 to provide a bias voltage to each of the photosensitive cells 22.

Each of the bias circuit 32, the scanning circuit 28, and the read-out circuit 30, may communicate with an acquisition control and image processing unit 34 over a connected cable (wired), or the DR detector may be equipped with a wireless transmitter to transmit radiographic image data wirelessly to the acquisition control and image processing unit 34. The acquisition control and image processing unit 34 may include a processor and electronic memory (not shown) to control operations of the DR detector 40 as described herein, including control of circuits 28, 30, and 32, for example, by use of programmed instructions. The acquisition control and image processing unit 34 may also be used to control activation of the x-ray source 14 during a radiographic exposure, controlling an x-ray tube electric current magnitude, and thus the fluence of x-rays in x-ray beam 16, and the x-ray tube voltage, and thus the energy level of the x-rays in x-ray beam 16.

The acquisition control and image processing unit 34 may store a plurality of data frames received from the DR detector and transmit image (pixel) data to the monitor 26, based on the radiographic exposure data received from the array 12 of photosensitive cells 22 in the DR detector 40. Alternatively, acquisition control and image processing unit 34 may process the image data and store it, or it may store raw unprocessed image data, in local or remotely accessible memory.

With regard to a direct detection embodiment of DR detector 40, the photosensitive cells 22 may each include a sensing element sensitive to x-rays, i.e. it absorbs x-rays and generates an amount of charge carriers in proportion to a magnitude of the absorbed x-ray energy. A switching element may be configured to be selectively activated to read out the charge level of a corresponding x-ray sensing element. With regard to an indirect detection embodiment of DR detector 40, photosensitive cells 22 may each include a sensing element sensitive to light rays in the visible spectrum, i.e. it absorbs light rays and generates an amount of charge carriers in proportion to a magnitude of the absorbed light energy, and a switching element that is selectively activated to read the charge level of the corresponding sensing element. A scintillator, or wavelength converter, is disposed over the light sensitive sensing elements to convert incident x-ray radiographic energy to visible light energy. Thus, in the embodiments disclosed herein, it should be noted that the DR detector 40 may include an indirect or direct type of DR detector.

Examples of sensing elements used in sensing array 12 include various types of photoelectric conversion devices (e.g., photosensors) such as photodiodes (P-N or PIN diodes), photo-capacitors (MIS), photo-transistors or photoconductors. Examples of switching elements used for signal read-out include MOS transistors, bipolar transistors and other p-n junction components.

Figure 2:
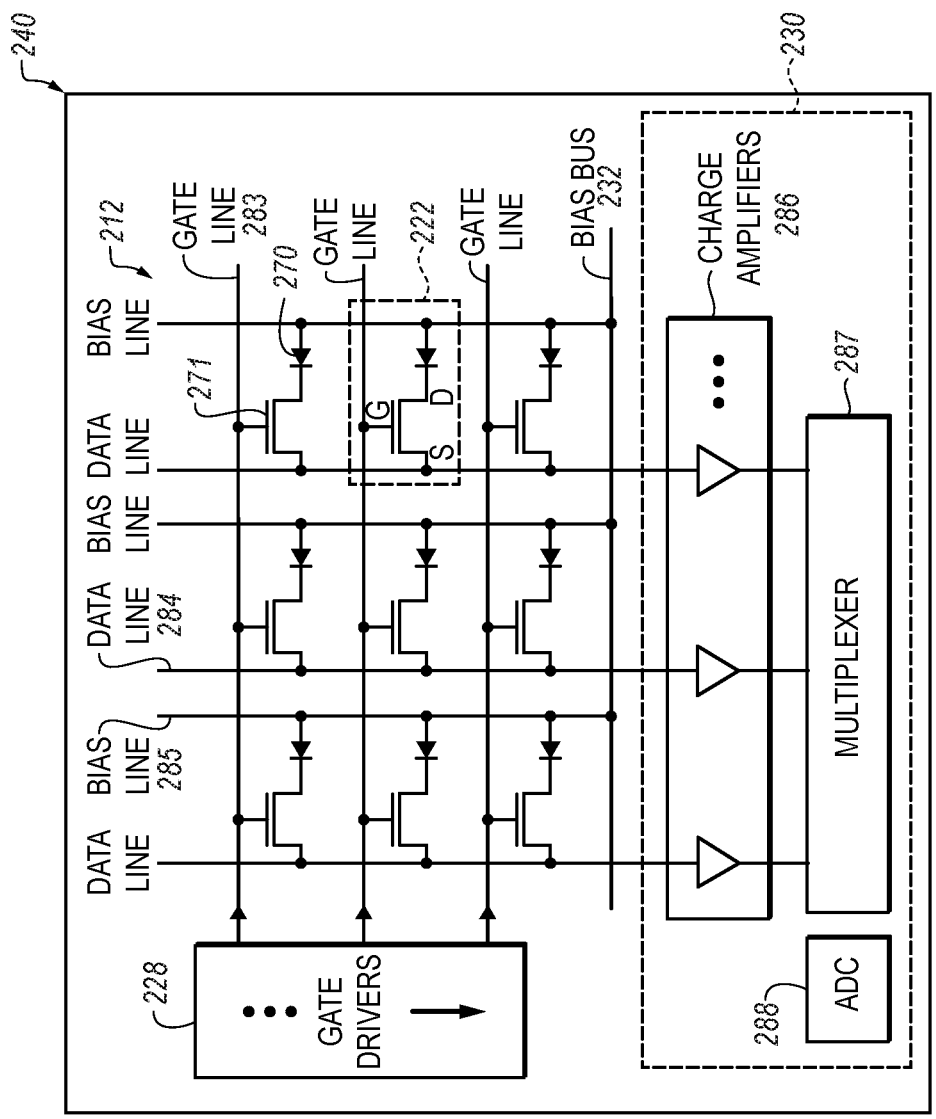
FIG. 2 is a schematic diagram of a portion of an exemplary imaging array in a DR detector used in the exemplary radiographic imaging system of FIG. 1.

FIG. 2 is a schematic diagram 240 of a portion of a two-dimensional array 12 for the DR detector 40. The array of photosensor cells 212, whose operation may be consistent with the photosensor array 12 described above, may include a number of hydrogenated amorphous silicon (a-Si:H) n-i-p photodiodes 270 and thin film transistors (TFTs) 271 formed as field effect transistors (FETs) each having gate (G), source (S), and drain (D) terminals. In embodiments of DR detector 40 disclosed herein, such as a multilayer DR detector, the two-dimensional array of photosensor cells 12 may be formed in a device layer that abuts adjacent layers of the DR detector structure. A plurality of gate driver circuits 228 may be electrically connected to a plurality of gate lines 283 which control a voltage applied to the gates of TFTs 271, a plurality of readout circuits 230 may be electrically connected to data lines 284, and a plurality of bias lines 285 may be electrically connected to a bias line bus or a variable bias reference voltage line 232 which controls a voltage applied to the photodiodes 270. Charge amplifiers 286 may be electrically connected to the data lines 284 to receive signals therefrom. Outputs from the charge amplifiers 286 may be electrically connected to a multiplexer 287, such as an analog multiplexer, then to an analog-to-digital converter (ADC) 288, or they may be directly connected to the ADC, to stream out the digital radiographic image data at desired rates. In one embodiment, the schematic diagram of FIG. 2 may represent a portion of a DR detector 40 such as an a-Si:H based indirect flat panel imager.

Incident x-rays, or x-ray photons. 16 are converted to optical photons, or light rays, by a scintillator, which light rays are subsequently converted to electron-hole pairs, or charges, upon impacting the a-Si:H n-i-p photodiodes 270. In one embodiment, an exemplary detector cell 222, which may be equivalently referred to herein as a pixel, may include a photodiode 270 having its anode electrically connected to a bias line 285 and its cathode electrically connected to the drain (D) of TFT 271. The bias reference voltage line 232 may control a bias voltage of the photodiodes 270 at each of the detector cells 222. The charge capacity of each of the photodiodes 270 is a function of its bias voltage and its capacitance. In general, a reverse bias voltage, e.g. a negative voltage, may be applied to the bias lines 285 to create an electric field (and hence a depletion region) across the p-n junction of each of the photodiodes 270 to enhance its collection efficiency for the charges generated by incident light rays. The image signal represented by the array of photosensor cells 212 may be integrated by the photodiodes while their associated TFTs 271 are held in a non-conducting (off) state, for example, by maintaining the gate lines 283 at a negative voltage via the gate driver circuits 228. The photosensor cell array 212 may be read out by sequentially switching rows of the TFTs 271 to a conducting (on) state by means of the gate driver circuits 228. When a row of the pixels 22 is switched to a conducting state, for example by applying a positive voltage to the corresponding gate line 283, collected charge from the photodiode in those pixels may be transferred along data lines 284 and integrated by the external charge amplifier circuits 286. The row may then be switched back to a non-conducting state, and the process is repeated for each row until the entire array of photosensor cells 212 has been read out. The integrated signal outputs are transferred from the external charge amplifiers 286 to an analog-to-digital converter (ADC) 288 using a parallel-to-serial converter, such as multiplexer 287, which together comprise read-out circuit 230.

This digital image information may be subsequently processed by image processing system 34 to yield a digital image which may then be digitally stored and immediately displayed on monitor 26, or it may be displayed at a later time by accessing the digital electronic memory containing the stored image. The flat panel DR detector 40 having an imaging array as described with reference to FIG. 2 is capable of both single-shot (e.g., static, radiographic) and continuous (e.g., fluoroscopic) image acquisition. In one embodiment, a significant portion of the imaging electronics of image processing system 34 may be disposed on board the DR detector 40 so that several image processing steps described herein may be performed on board the DR detector 40. The DR detector 40 may also include electronic memory, which may be referred to herein as frame buffers, to temporarily store captured image frames and perform processing as described herein.

Figure 3:
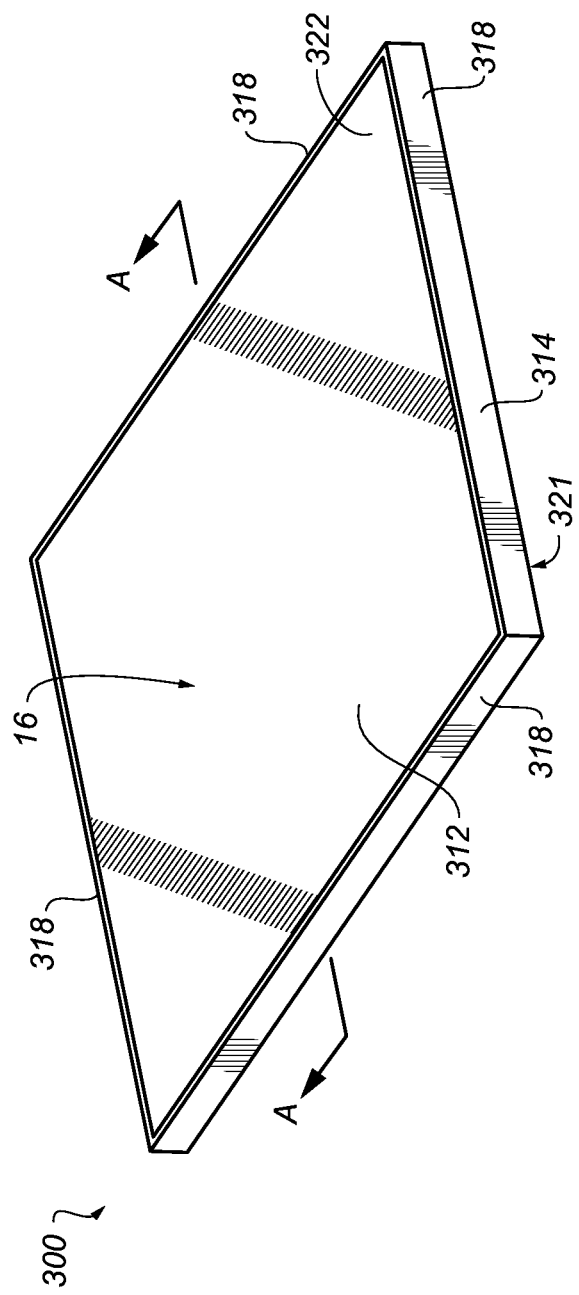
FIG. 3 shows a perspective view of an exemplary portable wireless DR detector.

FIG. 3 shows a perspective view of an exemplary prior art generally rectangular, planar, portable wireless DR detector 300 according to an embodiment of DR detector 40 disclosed herein. The DR detector 300 may include a housing 314 that encloses a multilayer structure comprising the photosensor array portion 22 of the DR detector 300. The housing 314 of the DR detector 300 may include a continuous, rigid, radio-opaque enclosure surrounding an interior volume of the DR detector 300. The housing 314 may comprise four orthogonal edges 318 and a bottom side 321 disposed opposite a top side 322 of the DR detector 300. A top cover 312 encloses the top side 322 which, together with the housing 314 substantially encloses the multilayer structure in the interior volume of the DR detector 300, and may be attached to the housing 314 to form a seal therebetween. The top cover 312 may be made of a material that passes x-rays 16 without significant attenuation thereof, i.e., a radiolucent material, such as a carbon fiber or plastic material.

Figure 4:
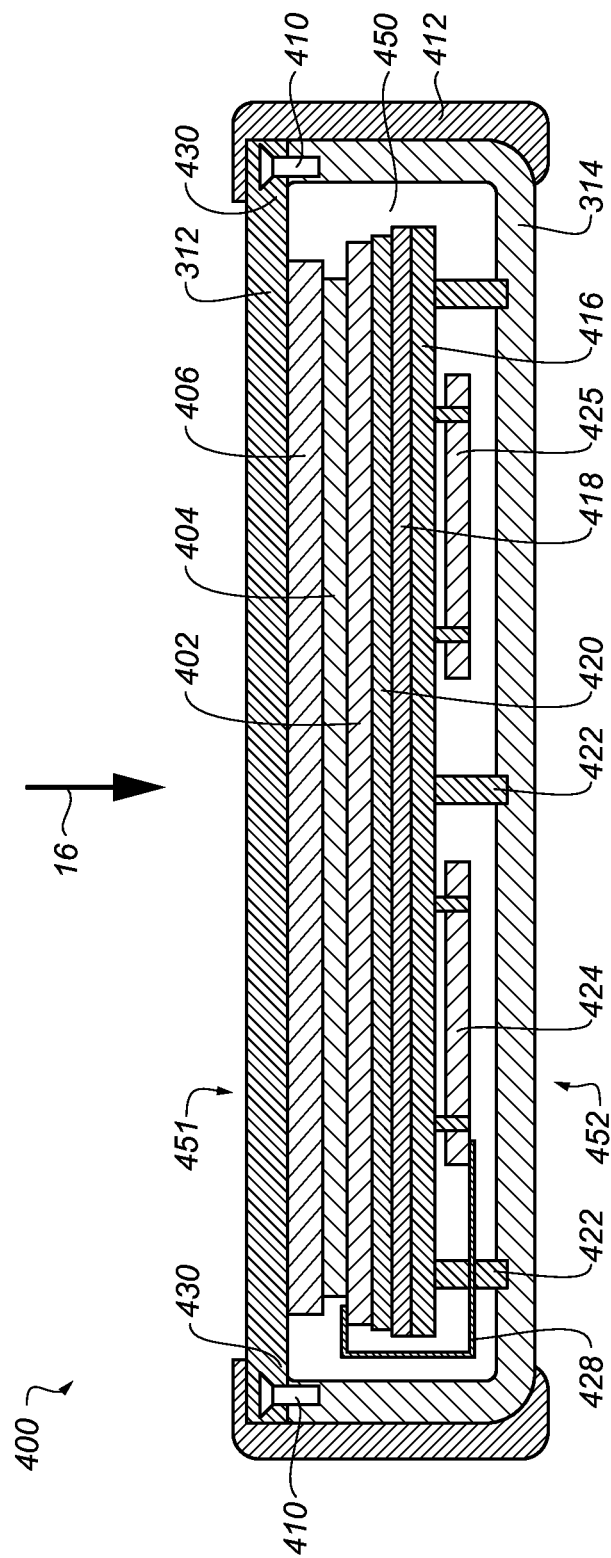
FIG. 4 is an exemplary cross-sectional view along section line A-A of the portable wireless DR detector of FIG. 3.

With reference to FIG. 4, there is illustrated in schematic form an exemplary cross-section view along section A-A of the exemplary embodiment of the DR detector 300 (FIG. 3). For spatial reference purposes, one major surface of the DR detector 400 may be referred to as the top side 451 and a second major surface may be referred to as the bottom side 452, as used herein. The multilayer imaging structure is disposed within the interior volume 450 enclosed by the housing 314 and top cover 312 and may include a scintillator layer 404 over the two-dimensional imaging sensor array 12 shown schematically as the device layer 402. The scintillator layer 404 may be directly under (e.g., directly connected to) the radiolucent top cover 312, and the imaging array 402 may be directly under the scintillator 404. Alternatively, a flexible layer 406 may be positioned between the scintillator layer 404 and the top cover 312 as part of the multilayer structure to provide shock absorption. The flexible layer 406 may be selected to provide an amount of flexible support for both the top cover 312 and the scintillator 404, and may comprise a foam rubber type of material.

A substrate layer 420 may be disposed under the imaging array 402, such as a rigid glass layer upon which the array of photosensors 402 is formed, and may comprise another layer of the multilayer structure. Under the substrate layer 420 a radio-opaque shield layer 418 may be used as an x-ray blocking layer to help prevent scattering of x-rays passing through the substrate layer 420 as well as to block x-rays reflected from other surfaces in the interior volume 450.

Readout electronics, including the scanning circuit 28, the read-out circuit 30, and the bias circuit 32 (FIG. 1) may be formed co-planar with the imaging array 402 or, as shown, may be disposed below frame support member 416 in the form of integrated circuits electrically connected to printed circuit boards 424, 425. The frame support member 416 is fixed to the housing 314 using frame support beams 422 to provide support for the multilayer structure just described. The imaging array 402 is electrically connected to the readout electronics, 28, 30, 32, over a flexible connector 428 which may comprise a plurality of flexible, sealed conductors. X-ray flux may pass through the radiolucent top panel cover 312, in the direction represented by an exemplary x-ray beam 16, and impinge upon scintillator 404 where stimulation by the high-energy x-rays 16, or photons, causes the scintillator 404 to emit lower energy photons as visible light rays which are then received in the photosensors of imaging array 402. The frame support member 416 may securely mount the multilayer structure to the housing 314 and may further operate as a shock absorber by disposing elastic pads (not shown) between the frame support beams 422 and the housing 314. Fasteners 410, such as screws, may be used to fixedly attach the top cover 312 to the housing 314 and create a seal therebetween in the region 430 where they come into contact. In one embodiment, an external bumper 412 may be attached along the edges 318 of the DR detector 400 to provide additional shock-absorption.

Figure 5:
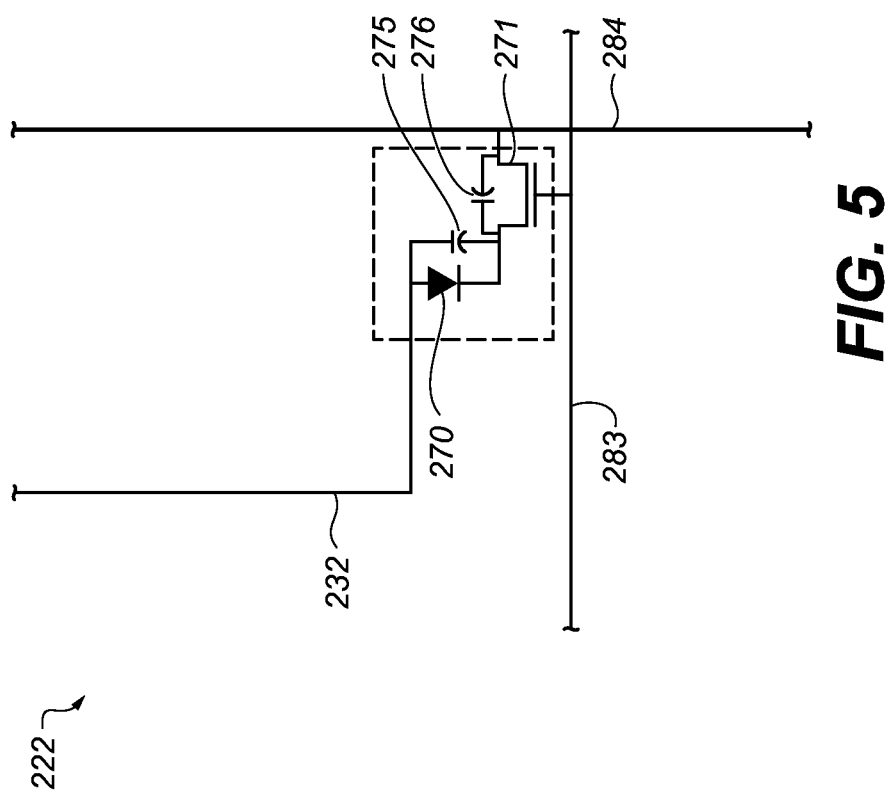
FIG. 5 is a diagram showing an exemplary pixel cell and selected constituent components.

FIG. 5 illustrates pixel cell 222 connected to bias bus 232, gate line 283, and data line 284, including a representation of a parasitic capacitance 276 between the source and drain of TFT 271. The parasitic capacitance 276 couples the cathode of photodiode 270 to data line 284. The parasitic capacitance introduces a noise signal into the data line 284 during an image readout operation by creating a low impedance path around TFT 271 even when the TFT 271 is in a high impedance 'OFF' state. The charge storage capability of the photodiode 270 is represented by the capacitance 275.

Extraneous noise affecting operations of the DR detector find entry points into the DR detector via parasitic capacitance intrinsic to the pixel array of the DR detector. A DR detector's readout operation may be performed after an x-ray source has exposed the patient and detector to x-ray radiation for a fixed exposure period predetermined and configured by an operator. The corresponding DR detector integration period, which is concurrent with the x-ray source "on time", may be configured to terminate after the x-ray source is turned off, because the image readout process normally follows the DR detector integration period. A portion of an image readout process occurring during the x-ray source exposure period is susceptible to the noise signals caused by the x-ray source.

There may be occasions when it is desirable to perform the image readout concurrently with the x-ray exposure. In this case the image readout from the DR detector may be initiated before the x-ray source exposure process has begun. The image readout process may run continuously until all image frames are acquired and stored.

During an imaging readout operation performed by a DR detector there may exist unwanted extraneous signals that affect the DR detector's readout operation by introducing data errors that result in degraded image quality when the image data is finally processed. The extraneous signals may originate from noise sources external to the detector or from sources within the detector housing. Extraneous signals may also be produced during the readout operation if the image readout occurs concurrently with an activation of the x-ray source. Extraneous magnetic fields may be generated by the DR system and related equipment in an imaging room which may cause parasitic effects in the readout circuitry or on the pixels in the photosensor array.

One type of external extraneous signal commonly found to interfere with DR detector image readout operations is caused by low frequency magnetic fields in the range of about one kilohertz up to hundreds of kilohertz. These magnetic fields may be produced by electrical equipment in close proximity to the DR detector. Typically, these noise inducing magnetic fields are generated by components such as inductors or AC motors that emit magnetic flux. Another source of extraneous noise includes power supplies that generate high voltages. These power supplies are often required by automatic exposure control hardware used with DR detectors.

The start of an x-ray exposure may be detected by image processing software running concurrently with the readout process where the image processing software tests each read out image row for increased signal intensity. After the start of the x-ray beam exposure is detected, the row by row image readout continues until the signal level returns to a pre-exposure level at about zero. After the x-ray beam exposure period has finished, the image readout process continues for at least one more image readout cycle in order to retrieve all exposure information accumulated by the pixels. In addition at least one more readout of an 'image free' frame may be performed to obtain any residual exposure information stored in the pixels, or a lag image, that is used to adjust and correct previous image data frames. When all collected image frames have been stored in an image buffer, which may include an image buffer internal to the DR detector comprising electronic memory locations for storing several image data frames, a post image processing function is performed on the buffered image frames to produce the final image. In one embodiment, parts of the image processing functions are performed in real time while the images are acquired using a processor and auxiliary electronics on-board the DR detector panel. This method of image readout for a DR detector has the benefit of providing asynchronous image readout of an x-ray exposure event without the need for invasive external hardware connections linking to and holding off the x-ray source control electronics until the DR detector system is ready for an x-ray exposure. This image readout method, however, causes image artifacts induced in part by parasitic capacitance and x-ray beam exposure that generate leakage current during the readout method.

Figure 6B:
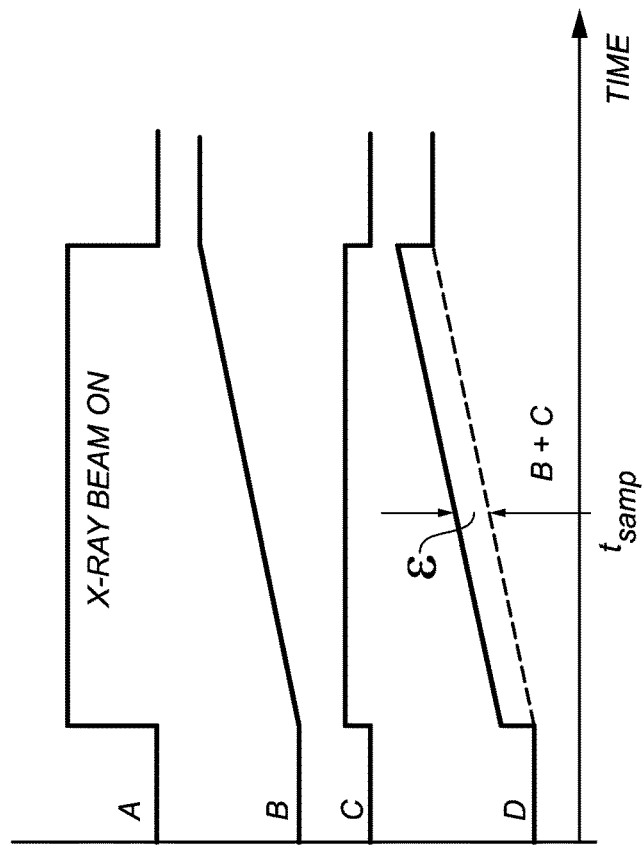
FIGS. 6A-B illustrate an exemplary pixel cell showing the generation of extraneous signals.
Figure 6A:
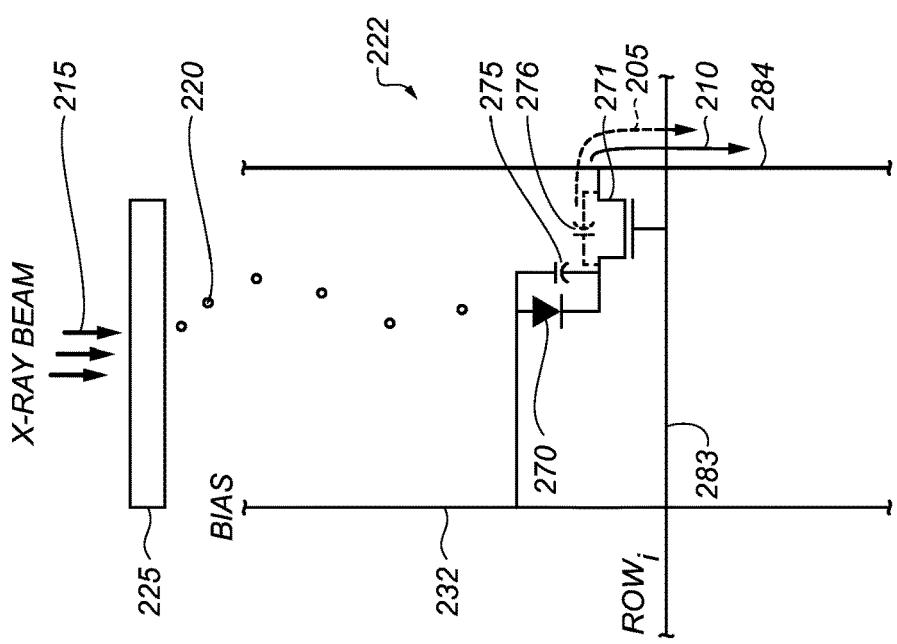

FIG. 6A illustrate an exemplary deleterious process occurring in the pixel cell 222 caused by effects of the extraneous signals. FIG. 6A includes two representative signal paths from photodiode 270. Signal path 210 is connected from the cathode of photodiode 270 through TFT 271 and out to data line 284 toward downstream read out circuitry, and is designed to carry DR detector image signals. The second signal path 205 is a parasitic signal path that bypasses TFT 271 via a parasitic capacitance 276 which effectively couples the drain and source of the TFT 271. This first signal path 210 is created when TFT 271 is switched to the low impedance 'ON' state using a signal on the gate line 283 delivered by a gate driver connected to the gate line 283. This first signal path 210 is the designed signal conduction path and is used during an image readout operation to read out the charge level stored in the photodiode 270 via its capacitive property, represented by capacitance 275. The parasitic capacitance 276 may be referred to as a leakage capacitance that creates a low impedance conductive path for time varying (non-DC) signals. An x-ray exposure period causes such a time varying signal due to the integration time wherein charge accumulates in the photodiode via a photon generated photodiode current, and so causes leakage into the data line 284 across the parasitic capacitance 276. An exemplary x-ray beam (photons) 215 may be received at the DR pixel 22, initially impacting a scintillator layer 225 which, in response to the x-ray photons, emits light photons 220. Light photons 220, in turn, impact photodiode 270 which, in response, generates charge carriers which are accumulated in the photodiode due to its intrinsic capacitance 275.

The graph of FIG. 6B illustrates a plot of various waveforms on its vertical axis versus time, on its horizontal axis. Waveform A represents an x-ray pulse of finite duration received by the pixel 222. While the x-ray pulse impacts the pixel 222, charge carriers accumulate in the photodiode 270 which is represented as a voltage ramp-up in waveform B. The voltage ramp B may be represented as a time-varying voltage (dv/dt) and so causes a leakage across the parasitic capacitance 276, represented by the leakage current waveform C, through the leakage path 205 as described above. Thus, the total signal as measured on data line 284, represented by total signal waveform D, during an x-ray pulse includes the sum of the pixel voltage (waveform B) plus the erroneous and extraneous leakage current of waveform C. As shown in the total signal waveform D at time $t_{samp}$, an error ε is caused by the leakage current. The time varying voltage produces leakage current over signal path 205 even when TFT 271 is in the high impedance 'OFF' state. This leakage current is the source of the extraneous data line signal caused by an x-ray exposure performed concurrently with an image readout operation.

During image readout of any pixel, an extraneous leakage current signal will be present on the data line and will equal the summed total of all other leakage currents in the pixels connected to the same data line, i.e. a column of pixels, by their parasitic capacitance 276. This results in an image readout error that is present only during the time that the pixel photosensor array receives x-ray fluence during an x-ray exposure. Image readout and x-ray exposure duration will rarely be equivalent, therefore, to insure that the image readout operation acquires all image data (photosensor charge), the image readout operation may be configured to extend longer in time than the x-ray exposure. This configuration will result in a part, but not all, of the image readout time duration to be affected by the extraneous leakage current.

FIG. 7 illustrates one embodiment of an image readout process 700 wherein rows of exemplary pixels n 701, n+1 702, n+2 703, and so on, are each read out one at a time in sequence and stored into the image row buffer 707. FIG. 8 illustrates an embodiment of a modified image readout process 800 using null row samples 802, 804, 806, in a readout process to acquire complementary data sets that include image data information from image readouts 701, 703, 705 stored in image buffer 707, and extraneous signal data information from null row readouts 802, 804, 806, stored in null row buffer 808. The buffers 707, 808, may include electronic memory for storing a plurality of image data frames in different addressable portions of the memory. Referring to FIG. 7 and FIG. 8, one modified image readout process embodiment may include successive image row 701, 703, 705, readouts that are interleaved with null row 802, 804, 806, readouts. Starting with read out of a particular image row n 701, the image data is digitized by A/D converters 288 (FIG. 2) and stored into the image row buffer 707 at a memory location corresponding to image row n 701. This image row readout is immediately followed by a null row 802 readout wherein the gate line 283 (FIG. 2) for that particular row of TFTs are turned off and any extraneous signal induced onto their corresponding data lines is digitized by A/D converters 288 and then stored into a null row buffer 808 at a memory location corresponding to image row n 701 of the image data. This interleaved process of alternate image row 701, 702, 705, readouts each followed by a null row 802, 804, 806, readout, respectively, may be termed a null row read operation and may be used to detect and capture extraneous signals present on the data lines 284. As described herein, such an interleaved process may be further modified to include two or more null row reads after each image data read, rather than only one null row read. Thus, each row signal can be read out (with gate line "on") followed by two null row readout cycles (with gate line "off") for each row in the detector image frame.

A null row read operation is similar to the standard image row readout process except that during the null row read operation none of TFTs 271 of data lines 284 are set to the 'ON' state. For example, the null row read state may be achieved by keeping all row gate drivers 228 turned off while repeating the standard image row readout process. When a null row read process is performed the signal information acquired does not contain image information from the pixels' photodiodes 270 but rather may contain extraneous leakage signal information present on individual data lines 284.

Figure 9:
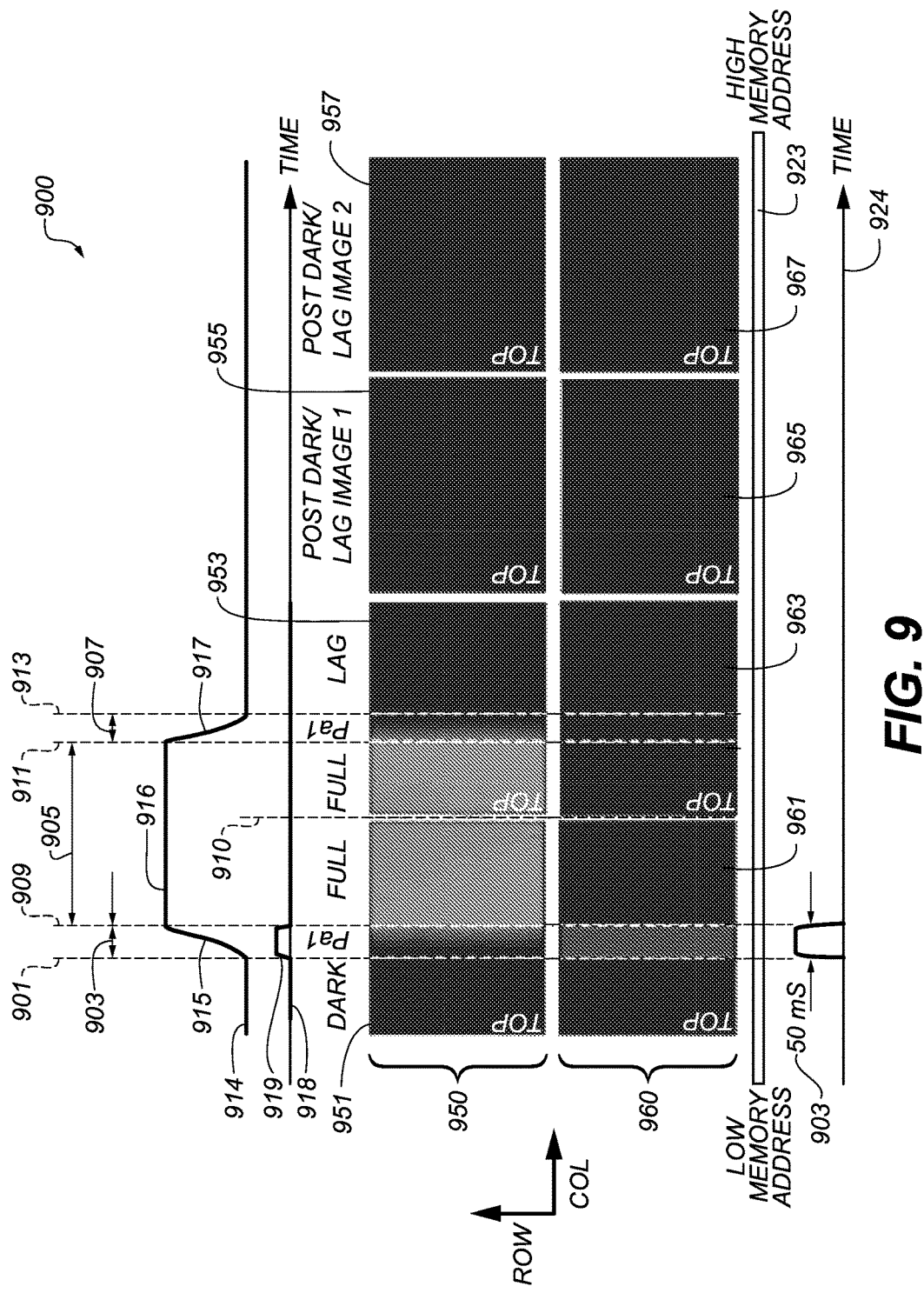
FIG. 9 is a diagram showing exemplary waveforms and image sets produced by an exemplary image readout procedure.

FIG. 9 illustrates a process 900 implementing complementary sets of image data frames 950, which set may include image data frames 951, 953, 955, and 957, and null row data frames 960, which set may include null row data frames 961, 963, 965, and 967. Each set, 950, 960, of data frames may include dark (or lag) image frames 955, 957, and dark (or lag) null row frames 965, 967, all data frames being acquired by performing the interleaved readout procedure as described herein with respect to FIG. 8. All the illustrated data frames 950, 960, may be stored in a storage buffer 923 comprising both the image row buffer 707 and null row buffer 808. With respect to a horizontal axis representing a time duration 924, the storage buffer 923 may include additional data frames captured during a time interval preceding a capture of the image and null row data frames 951, 961, respectively, and after a capture of the image and null row data frames, 957, 967, respectively. Thus, a null row data frame captured in a preceding time interval may include a band of extraneous signals such as illustrated in the null row data frame 961, which may be used to infer that extraneous magnetic flux is affecting operation of the DR detector. Such detection may be used to trigger a notification signal to the operator of the DR equipment to investigate potential sources of magnetic flux near the DR detector and to move such sources further from the DR equipment. As used herein, the term "frame" or "data frame" represents the data captured by the pixel array 212 in a DR detector 40. Rows of pixel data are oriented vertically in the perspective of FIG. 9, wherein the first row of pixel data is located to the left of each data frame, 951-957 and 961-967, labeled "TOP", and the last row of pixel data (i.e. bottom) is located at the rightmost end of each data frame, 951-957 and 961-967, in the perspective of FIG. 9. The rows of pixels in the DR detector are repeatedly read out from top to bottom to generate the data frames 951-957 and 961-967 as shown.

An x-ray source activation is illustrated as an exemplary 50 ms exposure 903 beginning at a first point in time 901 and continuing until the x-ray source is deactivated, or turned off, at a second point in time 909. The amount of image data available to be read out from the pixel array 212 is represented by the graph 914. Points on the graph 914 correspond to rows of pixels being read out from a DR detector providing the image data frames 950-960. The graph 914 indicates that, during the 50 ms exposure 903, an amount of image data available in x-ray exposed pixels increases from about a zero percentage level at the activation time point 901 to about a full 100% level 916 at the deactivation time point 909, as indicated by the rising portion 915 of the graph 914. Because a number of rows of image data are being read out during the rise time 915, each such row will have been read out without complete image data. Those rows being read out closer in time to the x-ray source activation point 901 will contain a smaller percentage of the full image data than the rows being read out closer in time to the x-ray source deactivation point 909. Those rows being read out during the time duration 905, after the x-ray source deactivation point 909, will contain a full 100% of the image data as indicated by the horizontal portion 916 of the graph 914. Note that during this full readout period 905 the last row of the DR detector's pixel array will have been read out, at about the time 910, to complete the data frames 951, 961, and that the DR detector readout will repeat, after about the time 910, starting at the DR detector's first row (TOP) to generate the next data frames 953, 963 (and repeating the readout for successive dark frames 955-957 and 965-967 as illustrated).

The falling portion 917 of the graph 914 represents an amount of data in corresponding rows of pixels that have not yet been read out. This may be understood by noting that the row of pixels being read out from the DR detector corresponding to the point in time at about 901 is the same row of pixels being read out from the DR detector at the point in time at about 911 and the row of pixels being read out from the DR detector corresponding to the point in time at about 909 is the same row of pixels being read out from the DR detector at the point in time at about 913. Thus, the rows of pixels that were read out during the time period 903 contained partial image frame data (i.e., less than 100% due to the active x-ray exposure not having been completed) wherein the remaining unread portion of image frame data from those rows of pixels is read out during the time period 907. It may be noted that adding together the read out data from the rising and falling data portions 915, 917, respectively, results in a full 100% read out of available image data with respect to that portion (or rows) of the image data frame.

Activation of the x-ray source during the time period 903 causes an increase in charge carriers in each exposed pixel 222 of the imaging array 212, which results in an induced time varying voltage in each exposed pixel 222. As described herein, the time varying voltage (dv/dt) generates a parasitic signal 919, in the graph 918, in the pixels of the imaging array even when the readout TFTs 271 are not turned on. This parasitic effect is shown in the null row data buffer image 961 wherein extraneous signals are generated during the rising portion 915 of the graph 914 corresponding to the x-ray source activation time 903.

A complete DR image may be obtained from the DR detector data frames obtained thus far by first adding together the image data frames 951 and 953 which results in a 100% full read of the image frame data corresponding to an x-ray exposure 903, and then subtracting from that total the null row image data represented in the null row data frame 961. This combined image frame data may be comparable to the representation of the total data representing an x-ray exposure as described with reference to graph D of FIG. 6B, and the null row data frame may be comparable to the error data ε as shown in FIG. 6B. Subtraction of the error data (null row data frame 961) results in a more accurate DR image.

Figure 11:
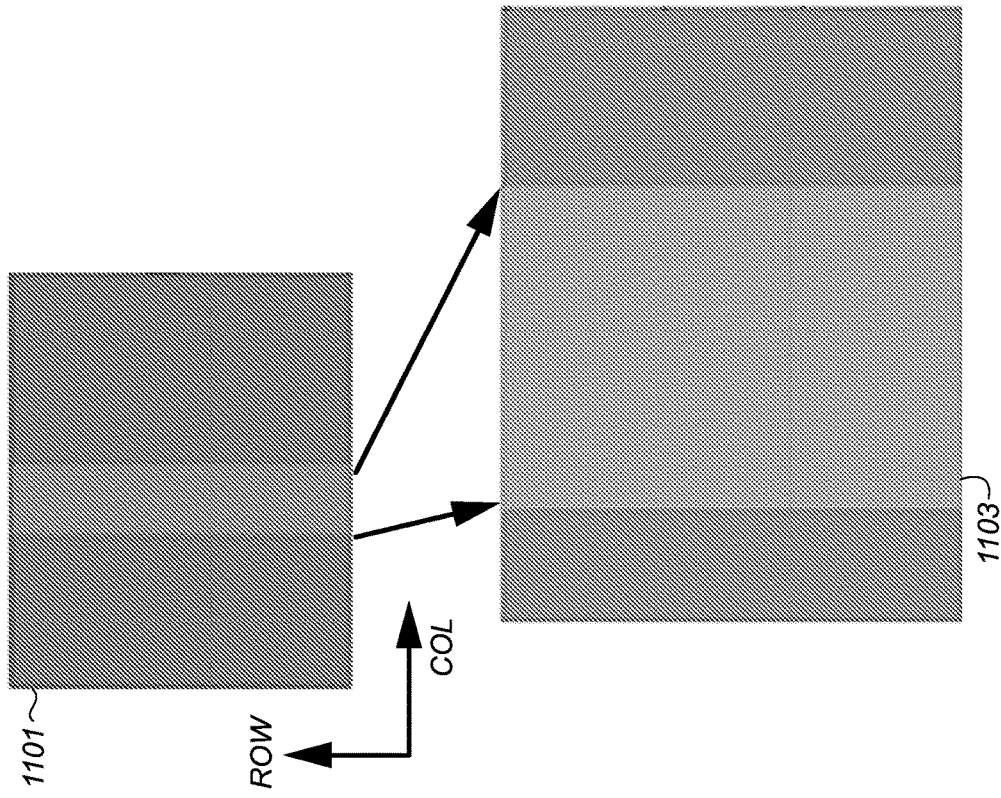
FIGS. 10-11 illustrate an exemplary reconstruction using two image data sets.
Figure 10:
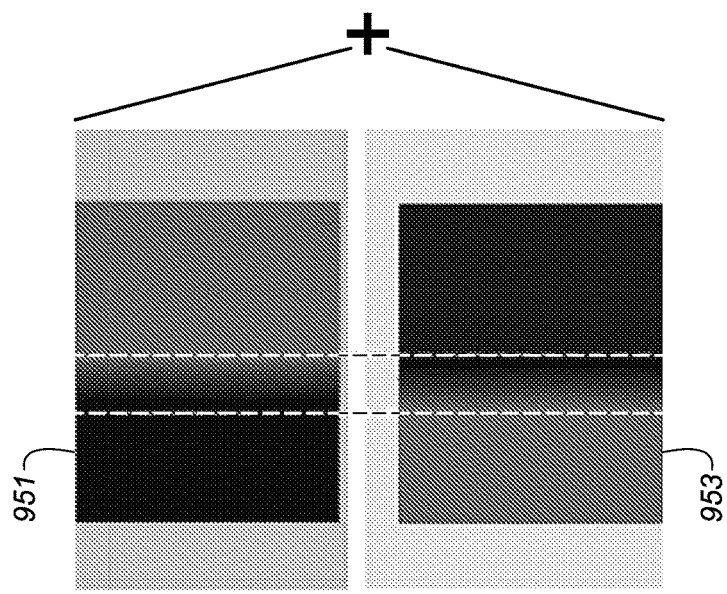

Referring now to FIGS. 10-11 there is illustrated an exemplary process of adding two image frames together as just described. Rows of pixel data are oriented vertically in the perspective of FIGS. 10-11. Image data frame 951 is added to image data frame 953 to obtain a total image data frame 1101 for the x-ray exposure 903 which reconstructs all the image data collected and stored in the image buffer. The various image frames 951, 953, 961, may be stored in separate portions of the image buffer 923, and may be combined by addition or subtraction to replace in the buffer memory one of the combined images or, alternatively, the combined image may be stored in another portion of the image buffer. The extraneous noise artifact may not be visible in the combined image of 1101 but can be better observed in the magnified image wherein the parasitic signal can be seen in the segment 1103 of the magnified combined image. This is the portion of the total image data that is corrected via subtraction of the null row read data.

Figure 12:
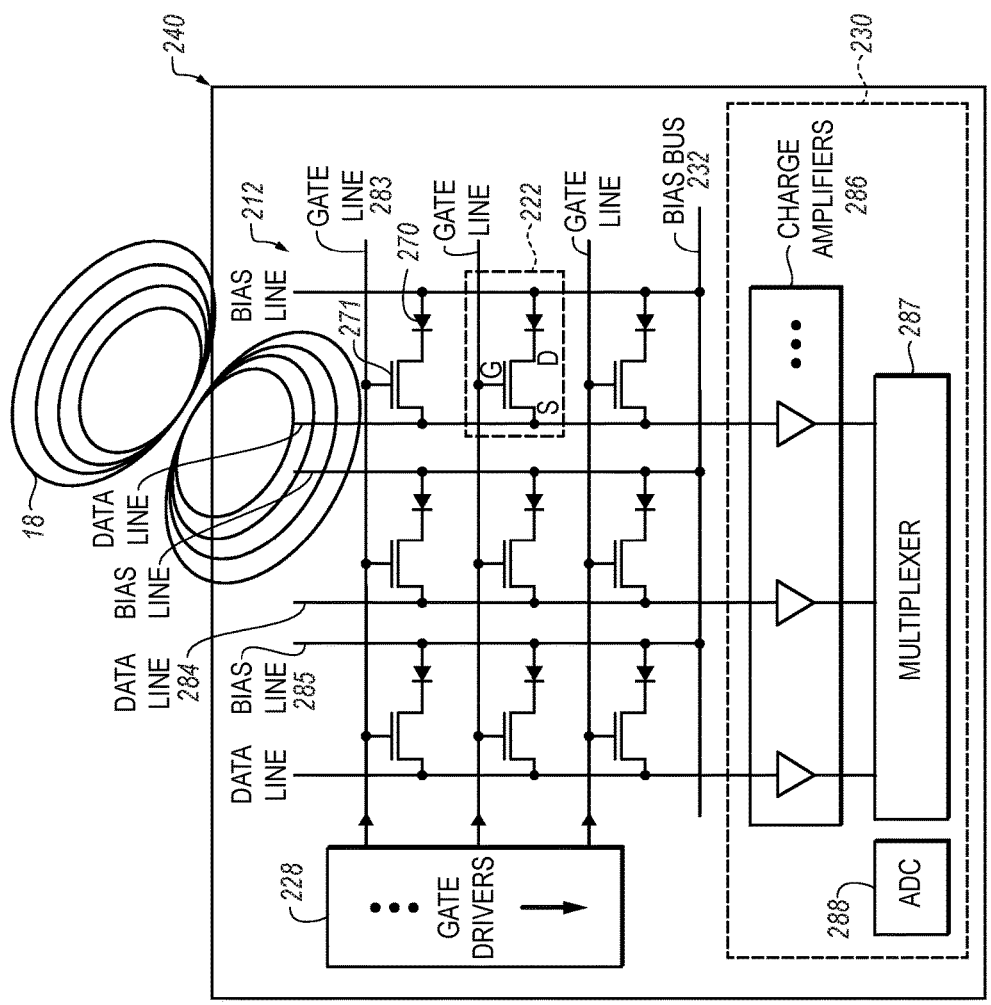
FIG. 12 is a diagram showing an exemplary pixel array sensor with row addressing and column readout components when subjected to an external low frequency magnetic field according to embodiments of the application.

FIG. 12 is another illustration showing the detector pixel sensor array 240 with an external magnetic field 18 in close proximity. As shown in the figure, the external flux from magnetic field 18 enters the DR detector enclosure 314 and links the internal data lines 284 of the pixel sensor array. If external magnetic field 18 is time varying, that is, has a frequency content that ranges from one kilohertz up to hundreds of kilohertz this can induce extraneous voltage signals onto the internal data lines. If present during a standard image readout process, the extraneous signals from this field will be added to the actual image data information produced by the x-ray exposure of the patient. This additional extraneous signal can introduce unacceptable image artifacts that degrade the final radiographic image.

Figure 13:
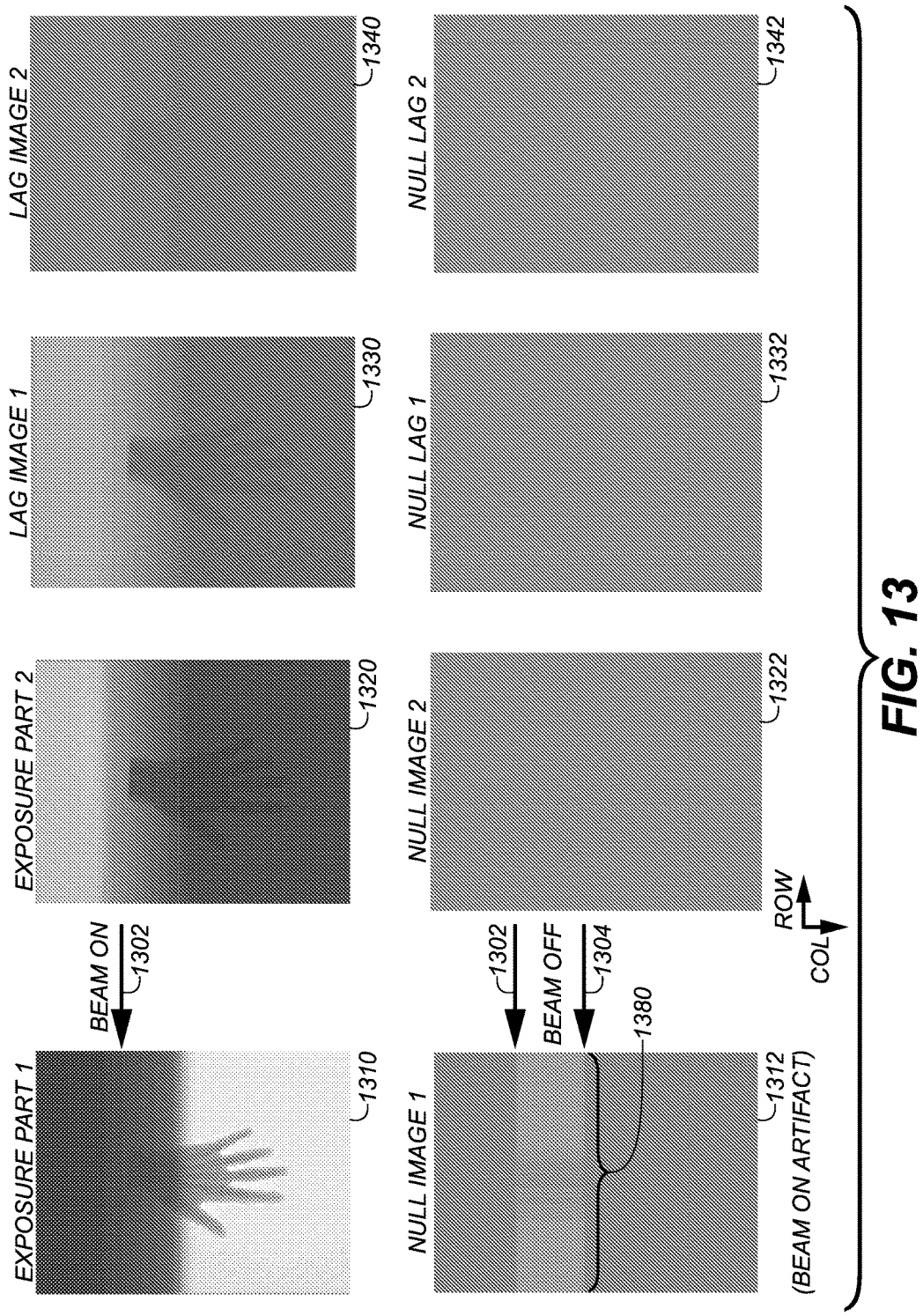
FIG. 13 is a diagram that shows exemplary images that can be used to restore the image information, decomposed into X-ray images and null images according to an embodiment of the application.

With respect to embodiments disclosed herein, the additional signal contributed to the image signals by parasitic capacitances can be estimated by reading out every row twice: first the image information can be read out with the gate line on, followed by a second readout of the same row with the gate line off (null image or leakage image). In one embodiment, the null image can include the additional signal associated with the beam-on condition. FIG. 13 shows an example of an image capture while the beam is on together with the associated null image. To form reconstructed images of high quality, certain exemplary embodiments disclosed herein may combine at least two images with X-ray content, one null image and one or more lag frames. The null image may help to improve the robustness of the beam off detection. However, each additional frame contributes electronic noise, so that the resulting combined image has higher noise than a single regular radiographic capture. This can be particularly important for low exposures to the detector, where electronic noise can be the dominant factor relative to quantum noise from the X-ray exposures.

FIG. 13 is a diagram that shows exemplary images that can be used to restore the image information, decomposed into X-ray images and null images according to one embodiment. Rows of pixel data are oriented horizontally in the perspective of FIG. 13. All the images shown in FIG. 13 are dark-corrected using an average (e.g., 2, 4) of pre-dark frames (not shown). In one embodiment, the images are read out row by row (e.g., top to bottom of the detector imaging area). The beam-on time 1302 may occur approximately one third into the readout of the first image frame 1310. The beam artifact 1380 can be seen in the null image 1312 for the first image frame 1310. In one embodiment, the signal in the beam artifact 1380 of the null image 1312 can be constant in the vertical direction during the beam on period, i.e., apart from a few rows of ramp up and ramp down. However, the magnitude in the horizontal direction in the beam artifact 1380 can depend on the combined signal across all photodiodes in each column.

As shown in FIG. 13, the second exposed image frame 1320 contains the remainder of the X-ray image data, e.g., the signal that was not read out during first frame 1310 because the beam was not on yet (beam-on 1302 occurred after those rows had been read out in the first frame 1310). This frame 1320 also contains the lag image data from the exposed signal read out during the first frame 1310. The third frame 1330 with image information is entirely a lag frame. The third image frame 1330 contains the first lag image data for the signal that was read out in the second image frame 1320 and the second lag image corresponding to the X-ray signal data read out in the first frame 1310. The fourth frame 1340 with image information is also a lag frame. For the exemplary case shown in FIG. 13, null images 1322, 1332, 1342 are not used for any image corrections. However, when the exposure (beam on) extends across multiple frames (e.g., longer than one frame, or starts in and goes beyond frame 1310), then the corresponding null images (e.g., 1322, 1332) can be used for correction.

Figure 14:
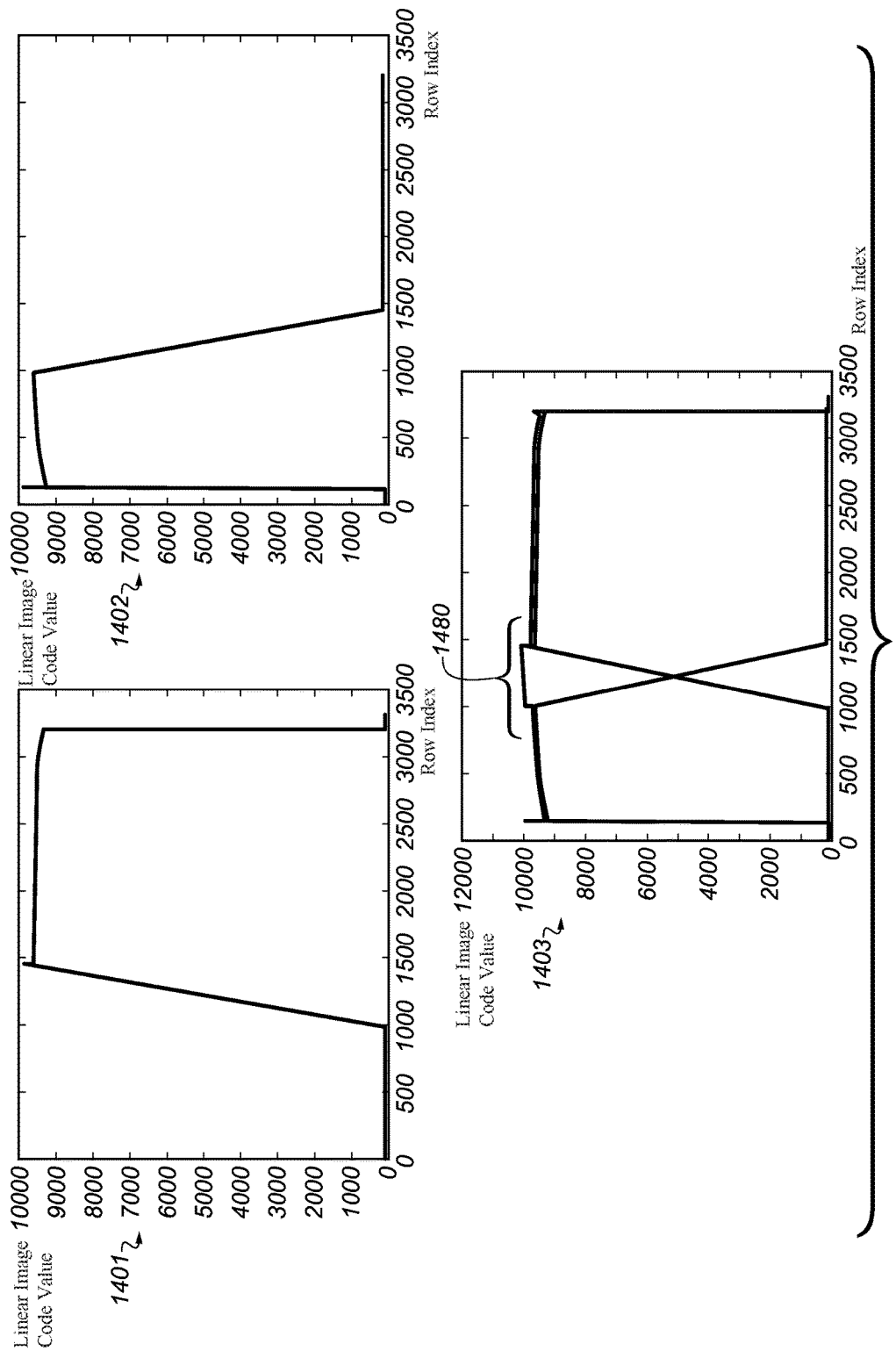
FIG. 14 is a diagram that shows image row intensity for flat field capture.

FIG. 14 is a diagram that shows graphs of composite image row signals for flat field capture similar to the capture of a human hand in FIG. 13. The signals from the first two frames (e.g., exposed image frame 1310 shown in the graph 1401 and 1320 shown in the graph 1402) are summed up, and the "pedestal" 1480 of the total signal during "beam on" can be seen in the graph 1403. The pedestal 1480 may represent the beam-on artifact 1380 shown in FIG. 13 or the error ε of FIG. 6B.

Figure 15:
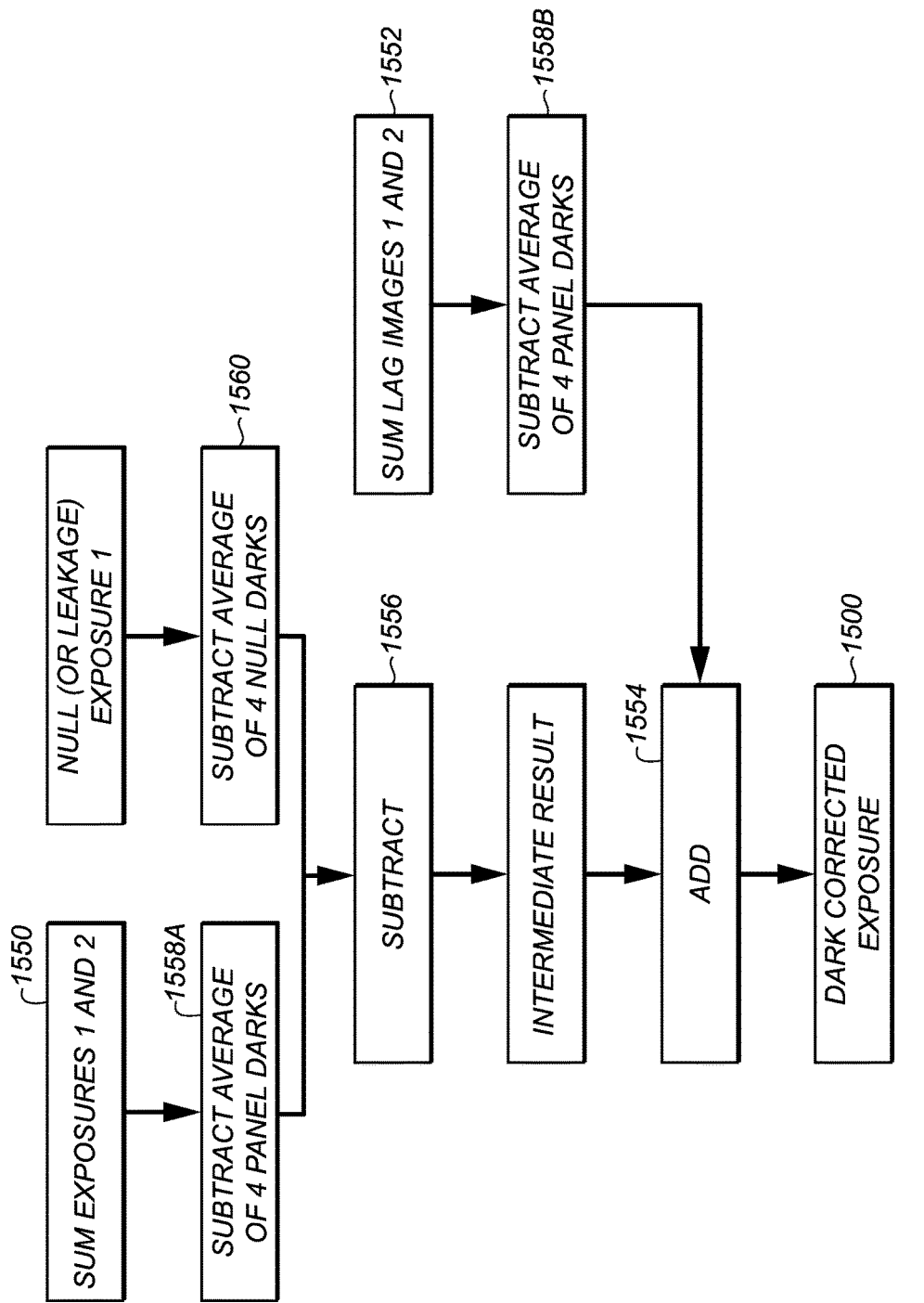
FIG. 15 is a flow chart that shows an exemplary image reconstruction and correction.

FIG. 15 is a flow chart that shows an exemplary image reconstruction and correction algorithm disclosed herein wherein the two image frames (e.g., 1310, 1320) containing the exposure information are added (operation block 1550) and the two subsequent lag frames (e.g., 1330, 1340) are added (operation block 1552) and then combined to form a reconstructed image 1500 (operation block 1554), while null image 1 (e.g., 1312) is subtracted (operation block 1556) to correct or reduce the pedestal (e.g., beam on artifact 1380). All null image (e.g., 1312) captures can be offset corrected (operation block 1560) using the last N null dark images (e.g., combined, weighted or averaged) prior to the first null frame 1312. All image captures (e.g., 1310, 1320, 1330, 1340) are offset corrected (operation blocks 1558A, 1558B) using the last N dark images prior to the first exposed frame 1310. As shown in the algorithm of FIG. 15, the electronic noise from all added and subtracted frames can add up in quadrature.

Figure 16:
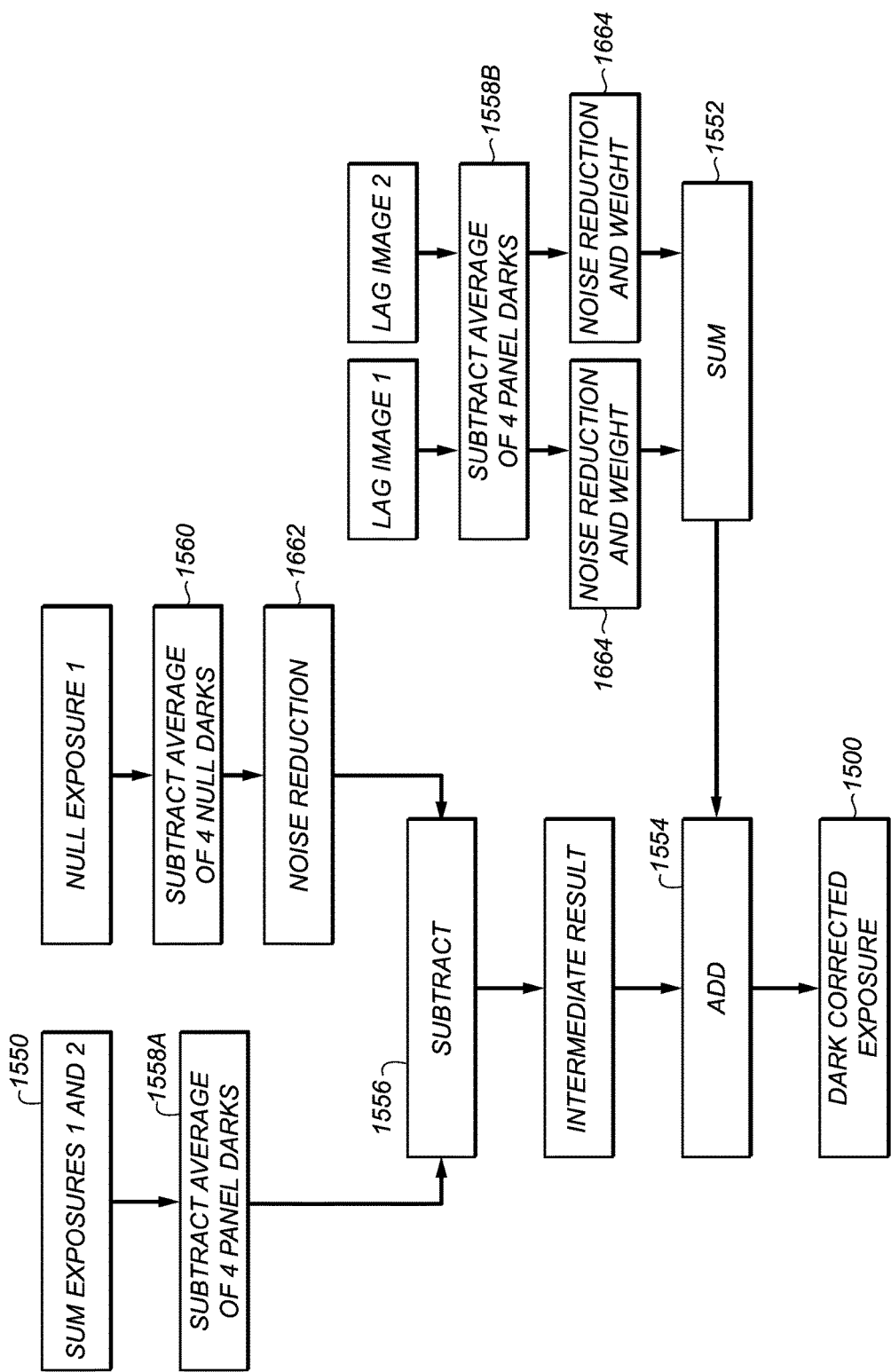
FIG. 16 is a flow chart that shows another exemplary image reconstruction and correction embodiment.

Certain exemplary system and/or method embodiments according to the application can provide the capability to reduce noise in the pre-dark corrected null and lag images before they are added or subtracted (e.g., weighted) from the images containing the signal. Furthermore, in accordance with certain exemplary embodiments, noise reduction can be considered for parts of the frames containing the exposure information (e.g., the dark section in the first image before the beam comes on could receive noise reduction). Noise in the final reconstructed and dark corrected image can be reduced in accordance with an exemplary embodiment shown in FIG. 16, wherein the steps of FIG. 15 are numbered similarly and alternative noise reduction steps 1662, and 1664 may be performed after step 1560 and 1558B, respectively. As shown in FIG. 16, all lag image captures (e.g., 1330, 1340) can be noise corrected (operation block 1664) using a first noise correction process (e.g., filter). Also all null images (e.g., 1312) can be noise corrected (operation block 1662) using a second noise correction process (e.g., filter) different from the first noise correction process (e.g., filter). In one embodiment, an optional different third noise correction process can be applied to all frames (e.g., 1310, 1320) containing the exposure information. In the embodiment shown in FIG. 16 the electronic noise from all added and subtracted frames can add up to less than quadrature. Then, gain and defect correction can be performed on the corrected image frame 1500.

In one embodiment, the first noise correction process 1664 and the second noise correction process 1662 are related to a frame or partial frame SNR (signal to noise ratio), responsive to a frame or partial frame SNR or proportional to a frame or partial frame SNR, related to an image content amount, responsive to the image content amount or proportional to the image content amount. In one embodiment, the second noise correction process can include correcting a pre-exposed portion, an exposed portion and a post-exposed portion of the dark corrected at least one exposure leakage frame.

FIG. 17 is a diagram illustrating the image capture cycle of the DR detector 40 for a method of beam detection in one embodiment. When the DR detector 40 is not in the active beam detection mode, the detector may perform idle refresh cycles to conserve power, wherein all the critical device voltages are set at a default level and a readout controller is in a power down mode. The detector may perform alternating scrolling reset and integration, while integrated circuit devices may be set to a default state. When the detector receives a signal to initiate beam detection, at time 1702, the readout controller is powered up and the integrated circuit devices are activated. In this mode the detector simply performs cycles of integration 1714 and readout 1718. The integration step 1714 is optional. These blocks of integration and readout are represented by corresponding rectangles in FIG. 17. The readout scheme is used during this beam detection mode as shown in FIGS. 18A and 18B and described herein above with respect to at least FIGS. 7-8. The description corresponding to FIGS. 7-8 utilize the method shown in FIG. 18A (one image row read interleaved with one null row read) while the sequence illustrated in FIG. 17 utilizes the method shown in FIG. 18B (one image row read followed by two null row reads). Thus, data lines are read out three times for each row address, once with the gate line on and twice with the gate line off (all other timing is the same for the second and third readout). This means that the resulting image frame has three times the number of rows as the sensor. The additional rows are referred to as null1 and null2 rows.

After the readout controller powers up, the detector signals to the host, or acquisition control 34, that it is ready 1702. At this point the detector may have an initial offset map, which gets updated after each frame capture. The detector runs the beam on detection algorithm on all dark corrected image frames until a beam on event is found 1706 (or 1710 for a subsequent beam on detection). Five dark images may be captured after power up 1702 (the first dark image 1716 may be discarded, and the following four dark image captures may be averaged for offset correction) whereupon the detector signals to the host that it is ready to look for the beam on signal 1704. After establishing the beam on event the detector starts running the beam off detection algorithm. This algorithm finds the last frame containing exposure information 1722, i.e., the first frame after the end of the exposure. After finding this frame 1722, the detector takes two more lag images 1708 and performs image reconstruction. FIG. 17 illustrates the case where the X-ray exposure falls within a single frame 1706. This frame and the next frame 1722 contain exposure information, i.e., the image rows before "beam on" get read out in the second frame. In this case a total of four frames, 1706, 1722, 1708, shown in FIG. 17 are needed for the image reconstruction. The exposure can span multiple frames requiring more than four images for reconstruction. After capturing the second lag image for the current exposure event, the detector captures four dark frames to establish the new offset map and signals to the host 1709 that it is ready to look for the beam again. This cycle repeats, e.g., beam found at 1710, until the detector either receives an external command to exit beam detect mode 1712 or a timer started at the last beam detect event has expired and the detector returns to idle refresh mode, i.e., the readout controller enters power down mode 1724.

Figure 19:
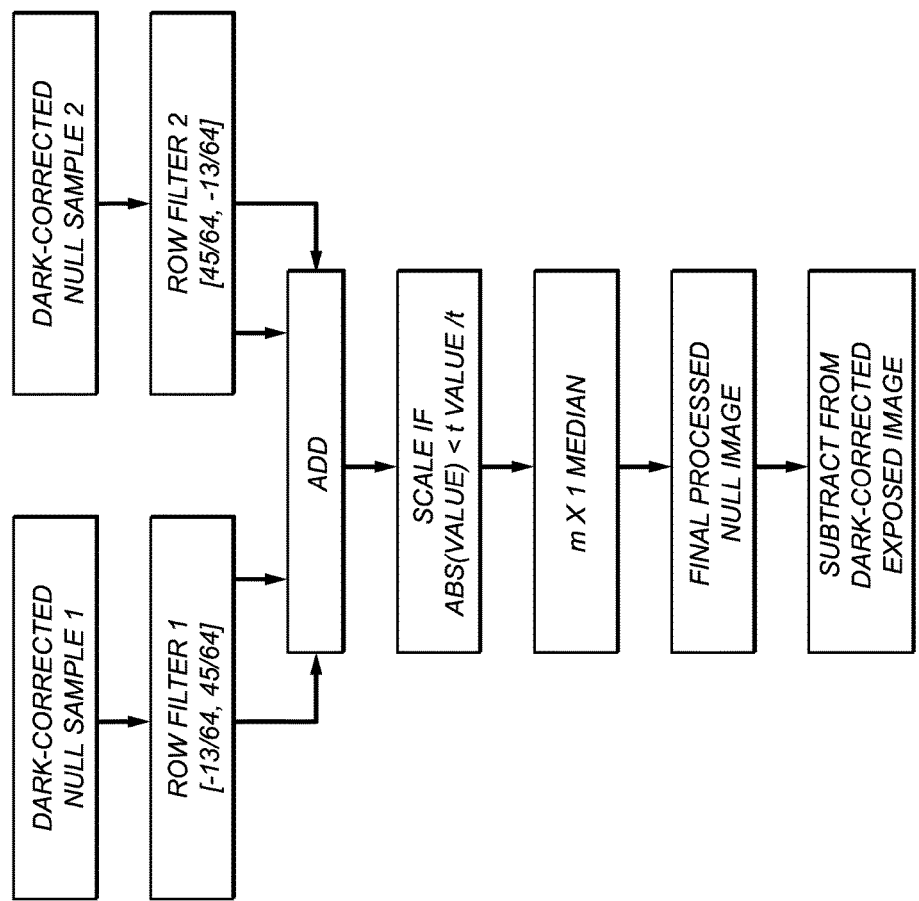
FIG. 19 is a flow chart of exemplary null image correction processing.

Image reconstruction may be undertaken as follows, with reference to FIG. 19 which illustrates null image processing for the readout scheme according to FIG. 18B by combining two null samples into a single null image, and noise reduction.

(1) Add all N dark corrected frames with exposure information. (The resulting image will be referenced as E.)

(2) Initialize the null image sum buffer $I_n$ to zero. Loop over all dark corrected null frames using index from i= 1 ... N−1: if $M_{nmax,i} < t_{n,lo}$ discard the null frame, where $t_{n,lo}$ is a threshold and $M_{nmax,i}$ is the maximum of the subset image of null frame I according to FIG. 21; else for each row j≥2, weight the two null readouts for rows j−1 and j according to the following equation and save to row j of the combined null image In,i (these calculations are done on a pixel by pixel basis in row j):

$$I_{n,i,j} = w_1 \cdot N1_{j-1} + w_2 \cdot N2_{j-1} + w_2 \cdot N1_j + w_1 \cdot N2_j$$

($N1_{j-1}$ is the first null read for row j−1, $N2_{j-1}$ is the second null read for row j−1, and similar nomenclature is applied to row j). The coefficients $w_1$ and $w_2$ should sum to 0.5 and preferably $w_2$ is greater than zero and $w_1$ is smaller than zero. The preferred settings are $w_1 = -13/64$ and $w_2 = 45/64$. Apply the following scaling to each pixel value CV of the image $I_{n,i}$: if abs(CV)<$t_{cv}$ then CV=CV·abs(CV)/$t_{cv}$. Then apply a 3×1 median filter to each pixel for further noise reduction. Add the fully corrected null frame $I_{n,i}$ to buffer $I_n$. The preferred settings for 16 bit systems are $t_{n,lo}=8$ and $t_{cv}=8$. These steps are shown in FIG. 19 for a single set of null captures.

(3) Calculate the offset corrected reconstructed exposure image $E_c$ as:

$$E_c = E - I_n$$

(4) If the intensity of the beam is modulated during the beam on period, for example as a rectified sine wave, this manifests results in variations temporal variations of the leakage signal, e.g. ripple, and another correction may be applied. If $M_{nmax}$ for beam on frame >$t_{n,med}$ correct the ripple artifact. The preferred setting for 16 bit systems is $t_{n,med}=120$. Execute the following algorithm (ripple suppression may be performed on all null frames captured during the beam on period):

```
If beam on frame == beam off frame
  {pass combined smoothed null image from step 2 for beam on
    frame to ripple suppression}
else if beam off frame > beam on frame +1
  {pass combined smoothed null image from step 2 for beam on
```

```
        frame + 1 to ripple suppression}
else    {if number of rows − jon > joff
        {pass combined smoothed null image from step 2 for beam
            on frame to ripple suppression}
    else
        {pass combined smoothed null image from step 2 for beam
            on frame +1 to ripple suppression}
}
```

The beam off frame is one frame prior to the last frame containing exposure information that is identified by a beam off detection algorithm.

(5) The additional corrections in steps 5 and 6 compensate for any temporal mismatch between the leakage signal in the exposed row and the corresponding null rows when the beam turns on and off. This mismatch is observed in particular when the beam turns on or off very fast. If ($M_{nmax}$ for beam on frame >$t_{n,hi}$) AND ($j_{on}$>top border−5) AND ($j_{on}$<bottom border+5) correct the beam on artifact. One setting for 16 bit systems may be $t_{n,hi}$=200.

(6) If ($M_{nmax}$ for beam off frame >$t_{n,hi}$) AND ($j_{off}$>top border−5) AND ($j_{off}$<bottom border+5) correct the beam off artifact.

(7) Initialize the lag sum buffer L to zero. Loop over the two additional dark corrected lag frames, N+1 and N+2: apply the following scaling to each pixel value CV of each lag frame: if abs(CV)<$t_L$ then CV=CV·abs(CV)/$t_L$. Then apply a 3×3 median filter to each pixel for further noise reduction. Add the fully corrected lag frame to buffer L. One setting for 16 bit systems may be $t_L$=40.

(8) Calculate the fully offset corrected reconstructed exposure image $E_{c,final}$ as: $E_{c,final}=E_c+L$ (9) Run gain and defect correction and any other corrections such as row noise removal, histogram shift and clipping.

Some X-ray scintillators, e.g., gadolinium oxysulfide (GOS), exhibit more light luminescence after absorbing the X-rays, whereas, for example cesium iodide has a fast response. A slow scintillator response mitigates the beam artifacts addressed in steps 5 to 7. For detectors with a GOS scintillator, corrections in steps 5 to 7 may be skipped by entering higher threshold parameters for $t_{n,med}$ and $t_{n,hi}$.

"Beam on" and "beam off" conditions can be detected in an x-ray system, and when detected, null frames may be used for correction such as when the beam-on condition occurs during the null frame. Exemplary beam-on and beam-off condition detections may include the following. The pre-condition for beginning beam-detection can be calculating an average of N dark-frames captured just after the panel (e.g., DR detector) is powered up. In one embodiment, the apriori calculation of a defect map for the imager of the panel can be used. The apriori defect map can allow such outlier pixel values to be excluded from beam-on detection calculations, thereby reducing the sensitivity to panel defects and panel noise. It is also known that dark signal levels drift upward as panels warm up. One embodiment can operate to maintain a running average of some number of the most recent dark frames. Each time a frame is read-out, if no image is detected in the frame it can be determined to be another dark-frame, and as such should be used in the calculation of the running average of the last N dark frames. Such a running average dark frame can be an input to the beam-on detection methods described below.

Beam-on can be detected by doing a line by line comparison of the mean signal level in the current line with the mean signal level of the corresponding line in the average dark frame. A threshold value can be calculated that takes into account the level of noise found in the N-frame dark average. In one embodiment, when the difference between the current line and the dark average exceeds the threshold value, a "beam-on" condition has been found within the current frame. In one embodiment, known defective pixel values can be excluded from the calculation of the mean signal level in the current line. In one embodiment, beam on can be detected using the exposure part or the leakage part (e.g., first frame 1310 or null frame 1312).

Figure 20:
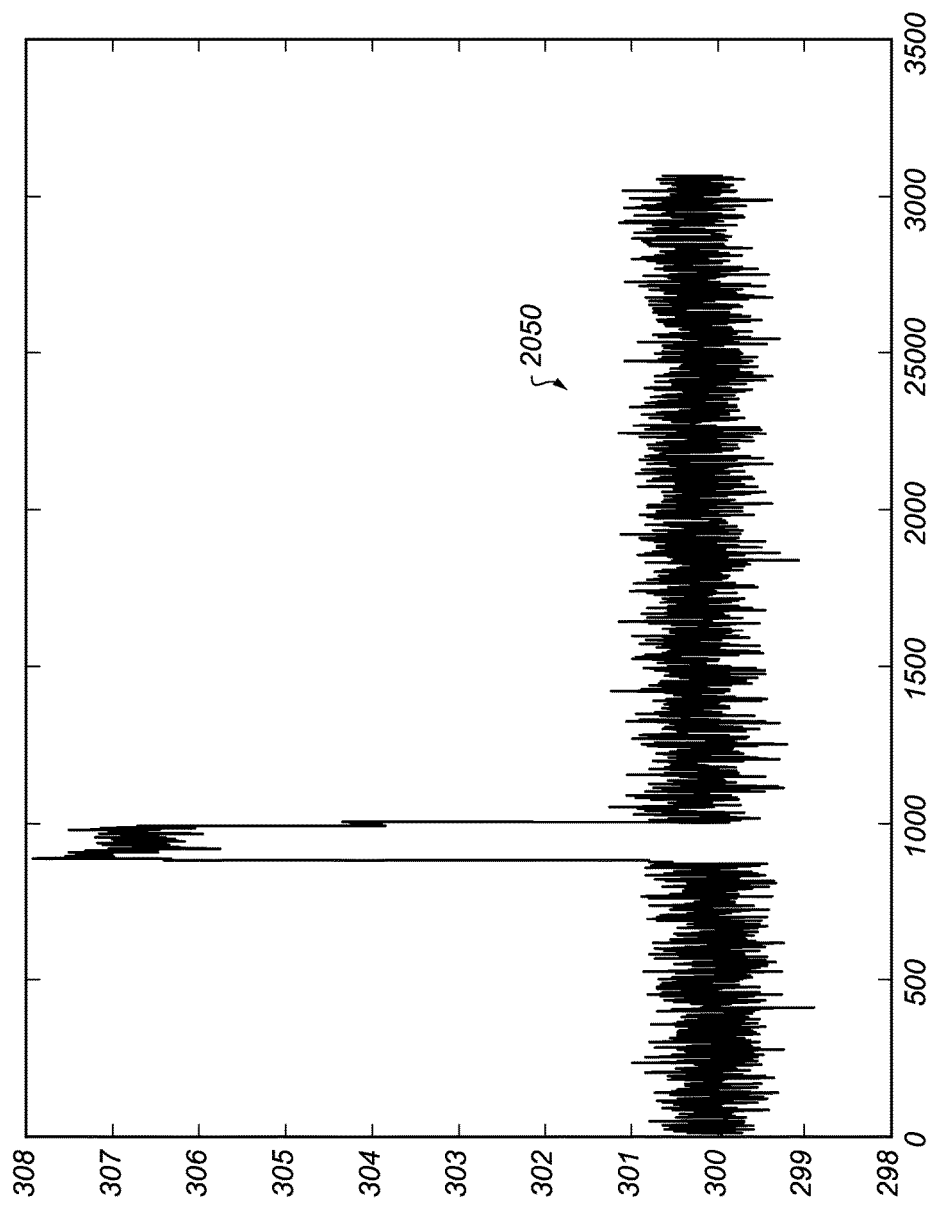
FIG. 20 is a diagram that shows an exemplary plot of leakage line sampling in a null image according to an embodiment of the application.

The beam-off event can be reliably detected by analyzing the line-average of the "null frame". This is shown in an example plot 2050 of a Null Line Average (or Leakage Line Average) as shown in FIG. 20. In the example plot 2050, it can be clearly seen that the beam has gone on and the beam has gone off during the first exposed frame. Once the "beam-on" frame is found, the mean signal level in the "null frame" can be used to determine a new threshold value to use in searching for the beam-off event. In different embodiments, when the mean signal-level drops below 75%, 50%, 25%, or 10% of the active signal level, then a beam-off condition has been found. In one embodiment, beam off can be detected using leakage data (e.g., null frame 1312).

In another alternative embodiment, the exposure leakage frame pedestal required for final image correction is approximated by calculation rather than measured directly. Such exemplary methods are useful because it makes the direct measurement of the exposure leakage frame unnecessary. This method is accomplished by first reconstructing a representative dark corrected full image frame from the partial images, dark images and lag images. Since in this embodiment an exposure leakage frame has not been obtained it is can be not used to remove the exposure leakage frame error from the representative image.

The reconstruction of an image is accomplished by adding all partial image frames and subsequent lag image frames together to form a reconstructed image using all the previously discussed noise reduction techniques. An operation is next applied to each column line of the reconstructed image to obtain the average value of all the pixels connected to any given column. The average value for each column can be obtained by summing the pixel values in a column and dividing by the number of rows in the detector frame. These calculated column average values are directly proportional to the magnitude of the exposure leakage generated in the column data lines during the X-ray beam exposure. To obtain a final representation of the actual exposure leakage frame the average values for each column may be scaled by a coefficient obtained by a separate calibration procedure that measures the actual leakage factor of the data lines in the particular type of detector being used. This single coefficient number will preferably be unique for that particular detector type.

The leakage coefficient for a detector type can be measured during the initial detector calibration process by placing the detector under a uniformly exposing X-ray beam that exposes the full image frame. The exposure intensity might vary from 50% to 100% of maximum or full scale exposure for the detector readout electronics. During the time period of the X-ray exposure event an exposure leakage frame is captured. Along with the exposure leakage frame several other frames may be captured as well and include: at least one dark leakage frame, an image frame and at least one dark image frame.

The exposure leakage frame may be first dark corrected by subtracting the dark leakage frame to obtain code values representative of the leakage signal on the data lines during exposure. Since the exposure is uniform over the detector surface area, the exposure leakage frame code values across all column lines can be around the same value. The captured image frame is next dark corrected by subtracting at least one dark frame to obtain the actual image code values produced by the X-ray exposure. Because the X-ray exposure was uniform over the detector surface the code values of the dark corrected image will also be approximately the same for all pixels. However, to obtain one representative code value from the image, the full image is averaged to obtain a mean code value for the image frame exposure. This mean code value can be designated as $I_{ave}$, the exposure leakage value obtained from the dark corrected exposure leakage frame can be designated as $U_{leak}$, and the X-ray beam exposure time can be designated as texp. The coefficient of leakage, $Kl_{eak}$, for the data lines of this particular detector can now be determined by the following equation:

$$(U_{leak}*t_{exp})/I_{ave}=K_{leak}$$

For example: if the leakage calibration exposure level is set to 80% of full scale, then for a 14 bit detector the exposure would be 0.8*16,384 or 13,107 code values. If the X-ray beam exposure period is 100 ms then exposure leakage frame data will have measurable values in those data lines that are readout during the 100 ms expose period. Therefore, if the average exposure leakage frame code value during this exposure was, for example 230, then the leakage coefficient for this detector would be calculated as:

$$230*0.1 \text{ sec}/13,107=0.00175$$

The reconstructed X-ray image that contains an exposure leakage frame pedestal error can now be corrected using this coefficient. As previously described, calculation of the exposure leakage frame from an actual X-ray image frame is accomplished by taking the column average value from the reconstructed image for each column and multiplying it by the measured detector leakage coefficient K. As an example: if a given column j has a summed average code value of 3498 and the X-ray beam exposure period was 100 ms then the exposure leakage frame error for this column j would be 3498*0.00175/Tb, where Tb is the beam on time in seconds. In this example, Tb was 100 mS, so the exposure leakage frame error for column j would be equal to [3498*0.00175/0.1] or 61 code values. This number is then subtracted from the image in the jth column at the rows where the X-ray beam exposure period coincided. This location is determined by identifying which rows were actively being readout during the exposure period between the detected beam on and beam off times. The column exposure leakage value may be subtracted only from rows that were actively readout during exposure.

Since it may occur that the beam on time may be longer than the readout time of one image frame, that is the beam exposure period is longer than the frame readout time, there may be some rows that were successively readout from one frame to the next frame and that have exposure leakage error in both of the readout values. This means that when the partial image frames are reconstructed there might be certain rows that may have the exposure leakage value subtracted more than once. As an example, if it was determined that rows n through row n+234 were readout twice during beam exposure, the calculated exposure leakage error would be 2*61 or 122 for rows n through n+234 for the column j data line.

Calculation of the column leakage frame error codes are repeated for all column lines to obtain the exposure leakage frame error introduced into the image during the readout process. To remove the exposure leakage frame error from the reconstructed image the calculated column leakage error is subtracted column by column from the reconstructed image rows for those rows that were readout during the time when the X-ray exposing beam was on. Therefore, it is necessary to establish what row was being readout when the beam on condition was detected and what final row was being readout when the beam off condition was detected.

A beam off event can be detected by comparing image line data values concurrently with the readout process after the beam on event has been detected. In such exemplary methods, each particular image line of data is compared to the previous readout frame of the exact same image line to determine if the present readout value in the current image line is greater than, less than or approximately the same as the value readout in the previous frame. If the beam was on in the previous frame when a particular image line was readout and is still on during the next frame during readout of the same line then the values will be approximately the same.

Having determined when the beam-off event occurred, when to stop reading out exposed image data can be determined. It is the nature of continuous readout that image data can be read out from the line at which the beam came on until one full frame beyond the time of the beam-off event (e.g., to capture a full exposed image). From the null image, it was determined that the beam went off during the first image frame (e.g., 1310). However, the presence of image data clearly continues until the corresponding line in the following image frame (e.g., image frame 1320).

Second, noise reduction can be applied to the null image. Various methods can be used. In one embodiment, a median filter or other low pass filter can be applied to the image. The filter preferably can maintain the top and bottom edges in the image associated with the beam on event and beam off event. In one embodiment, exemplary filters are preferably wider in the vertical direction compared with the horizontal direction.

As exemplified herein, the image readout process for a DR detector system may be performed after an x-ray expose-integration period has occurred. The purpose of the image readout operation is to acquire x-ray exposed patient image data from the DR detector's pixel array produced by the expose-integration process. The image information may be sequentially read out from each pixel row of the detector array into an internal image buffer, as described herein. The first exposed image readout may be immediately followed by a second non-exposed-integration period, which may be performed during an interval when there is no incident x-ray radiation impinging the sensor array of the DR detector. Since no x-ray radiation is present during the non-exposed-integration period, there is no new image information in the second read out image (e.g., lag image 955). However, because the first image readout operation leaves a small percentage of signal data remaining in the detector pixel array, the second readout operation recovers this left over signal data. The second read out image is typically referred to as image lag or simply a dark image. These steps may be repeated to obtain a third non-exposed-integration operation image without x-ray radiation to obtain a second dark image frame. A post processing operation may be performed on the set of acquired image frames, e.g., the exposed image having one or two frames, the first non-exposed dark image frame and the second non-exposed dark image frame may be added together or otherwise processed, to produce the final artifact free DR detector image.

The complementary set of image data and null row data may then be processed to determine the magnitude of any extraneous signal present on the data lines during the image readout operation, as described herein. In one embodiment, when extraneous signal magnitude is above a certain threshold, it may be compensated or removed from the image data by a process of combining (e.g., subtracting, weighting) the null row data from the image readout data. Subtracting the null row data from the image readout data may reduce or remove extraneous signal noise from the image readout data because Null Row data does not contain image data information from the pixel sensor array.

One caveat to such methods is that because the image readout operation is not perfectly simultaneous with the null row read operation, there may be some error in any measured extraneous signal if the frequency components of the extraneous signal are a prescribed amount greater than (e.g., twice) the readout sampling frequency of the null row read operation. This condition violates the Nyquist sampling criterion and may produce an erroneous aliased signal in the null row read data. If these aliased signals are present then it may be difficult to remove the extraneous signals from the image data by subtracting the two image sets.

When it is likely that extraneous signal frequencies are higher than the readout sampling frequency an alternate method may be used. This method implements a series of null row read operations that are performed before an x-ray exposure process has been initiated and may be used to detect if there is extraneous signal noise from external low frequency magnetic fields present on the data lines before the x-ray exposure and image readout operation has started. In this case, successive null now reads are performed and the digitized data line signals are stored into a temporary row buffer similar to the buffers shown in FIG. 8. A real time digital processing algorithm is then applied to the data from the null row read operation to determine if any extraneous signal is present by comparing a magnitude, or intensity, of the data obtained. While the frequencies of external magnetic fields will most likely be greater than the null row read sampling frequency the aliased signals in the null row read data is not a concern because this method only needs to detect that an extraneous signal was present.

According to exemplary embodiments, null row read data may be used in several ways to detect, compensate for, reduce and prevent extraneous signals from interfering with the standard image readout operation. One null row read process embodiment may be used to detect the presence of extraneous signals (e.g., null row read data) before an x-ray exposure occurs. As discussed previously, when the image readout operation is performed concurrently with an x-ray radiation exposure operation an extraneous signal is impressed on all data lines in the pixel array sensor. The magnitude of the extraneous signal on the individual data line is dependent on the number of photons at each of the photodiode sites along the entire data line and this is dependent on the intensity of x-ray fluence impinging the scintillator at the photodiode sites along the length of the data line.

Exemplary digital processing algorithms to detect extraneous noise on the data lines may be implemented in firmware and software using high speed digital processing electronics, such as Field Programmable Gate Arrays (FPGAs) and CPUs, which are placed internal to the DR detector. If any extraneous signal is detected, this condition may be communicated by the DR detector system hardware and software to the operator through a visible/audible alert at the system console. The operator may then take preventative steps to remove the source of magnetic fields to avoid interference with the DR detector system image readout operation. This is especially useful for portable wireless DR detector systems which, when used by mobile x-ray units, may be operated in many different locations within a hospital or clinic.

When the image readout operation is complemented with an interleaved null row read operation according to embodiments described herein, means may be provided to perform the image readout operation during the x-ray exposure period and address or remove the inherent leakage current image artifact produced by parasitic capacitances in the pixel array sensor.

In one exemplary embodiment, an error produced by extraneous leakage current on the data line may be determined independent and separate from the image data by following an image row readout process with a corresponding null row read process. Since the leakage current is present on the data lines even when the TFTs are all turned off this provides a way to measure the extraneous leakage current right after at each image row read. Since the leakage current is measured separately and independently, it may be subtracted from the image data in a post process operation. Further, because the extraneous leakage current onto the data lines effectively remains at a constant level during the x-ray exposure, there is no danger that aliasing error will be present in the null row read data.

Figure 21:
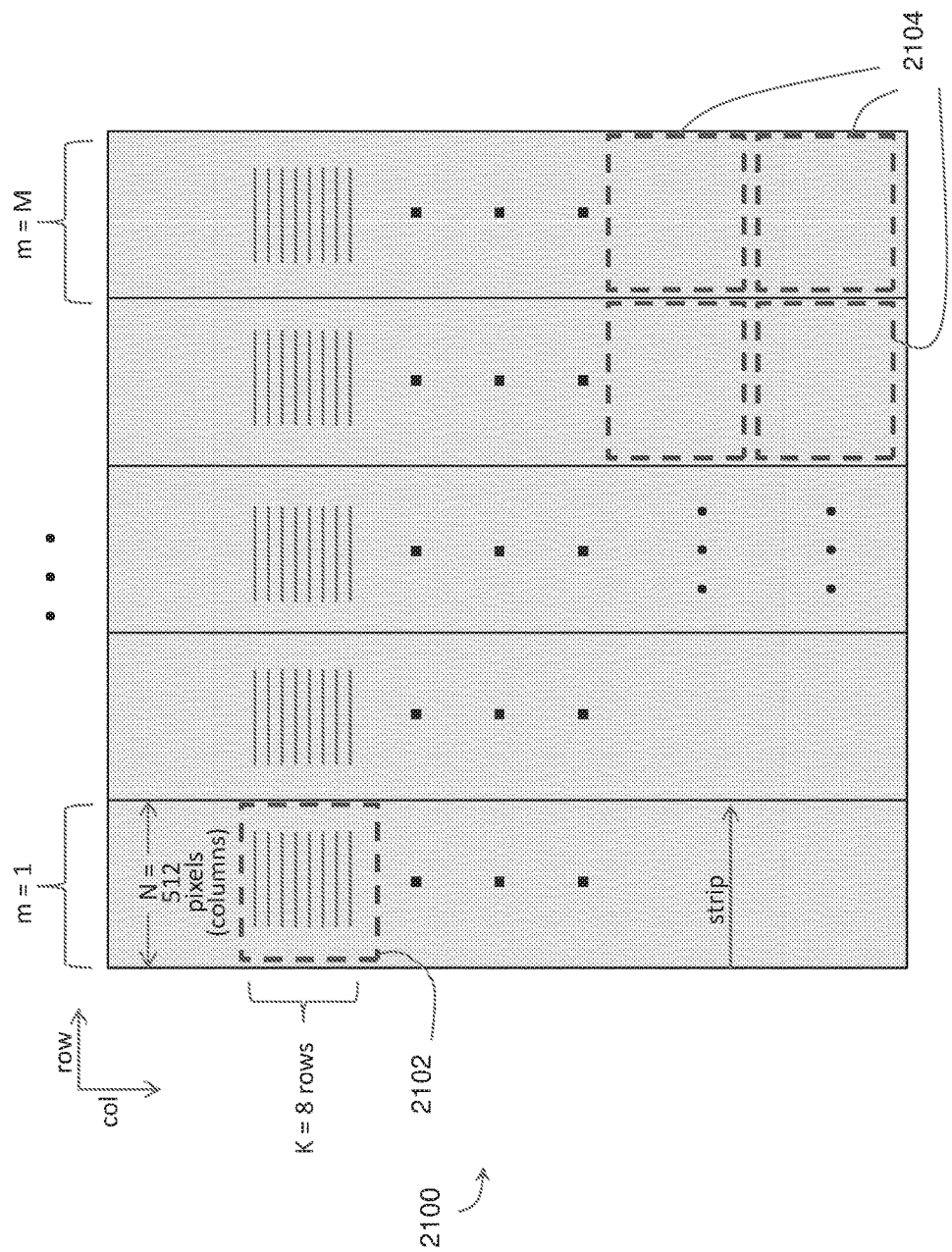
FIG. 21 illustrates pixels in a DR detector divided into five blocks per row of pixels and including multiple rows in the calculation of statistical measures per row and block.

In one embodiment, a robust beam on and off detection method based on continuous readout is disclosed. The method may be implemented on a processing chip. e.g., FPGA (field-programmable gate array), that is part of the DR detector assembly and may be used to control operations thereof. The DR detector may be in wired or wireless communication with a host processor that is part of a host processing system, such as the image processing system 34 described herein. Referring to FIG. 21, there is depicted a representation of controllable pixel addressing in an exemplary DR detector 2100 schematic figure. Individual pixels, subsets of pixels, or the entire array of pixels, may be programmably addressed or accessed in the DR detector 2100 by column and row, as described herein. As shown in FIG. 21, columns of pixels extend vertically and rows of pixels extend horizontally. To practice the methods described herein, the columns of pixels may be logically divided into M blocks m, where M=5 and each block m includes 512 columns of pixels, in an exemplary embodiment. Each row k may thereby be said to contain (5×512) total pixels with 512 pixels thereof in each of the M blocks. An exemplary subset of pixels 2102 may be said to contain 512 consecutive columns of pixels and K consecutive rows k of pixels, where K=8 in one exemplary subset size. For image analysis purposes. i.e., beam on and off detection, a single statistical measure is computed and stored for each subset 2102 of pixels. This image is significantly smaller in size than the original image and is referred to as "strip" image. As used herein, the term "line" may refer to an entire row of the strip image, in this case containing the five image averages, one for each of the 5 subsets. The entire array of pixels in DR detector 2100 may be logically divided into a number of equal sized subsets 2104 similar in size to exemplary subset 2102. "Strip" or subset images can be calculated for image frames, e.g., 1310 and 1320 in FIG. 13 and null frames, e.g., 1312 in FIG. 13. Strip images may be stored for any of the frames shown in FIG. 13. Preferably, the size of the strip images is M times the number of rows of the detector. To reduce the amount of stored information per frame further a statistical measure can be calculated for the strip image and stored as a separate strip image. For example, the maximum of the M values for each line of the strip image may be stored in addition or instead of the original strip image of the frame. This strip or subset image would have an entry for each row of the detector. Several different kinds of strip images may be needed for the robust detection of beam on and off events. For example, one strip image may contain the average pixel value of M subsets of pixels 512 columns wide and 8 rows high (7 of the preceding rows and the current row), whereas another strip image contains the average pixel value of subsets of pixels 512 columns wide and one row high. Yet another strip image may be a logical array deduced from a strip image containing the average pixel value receiving an entry of one if the average value of entry in the original strip image exceeds a predetermined threshold.

Figure 22:
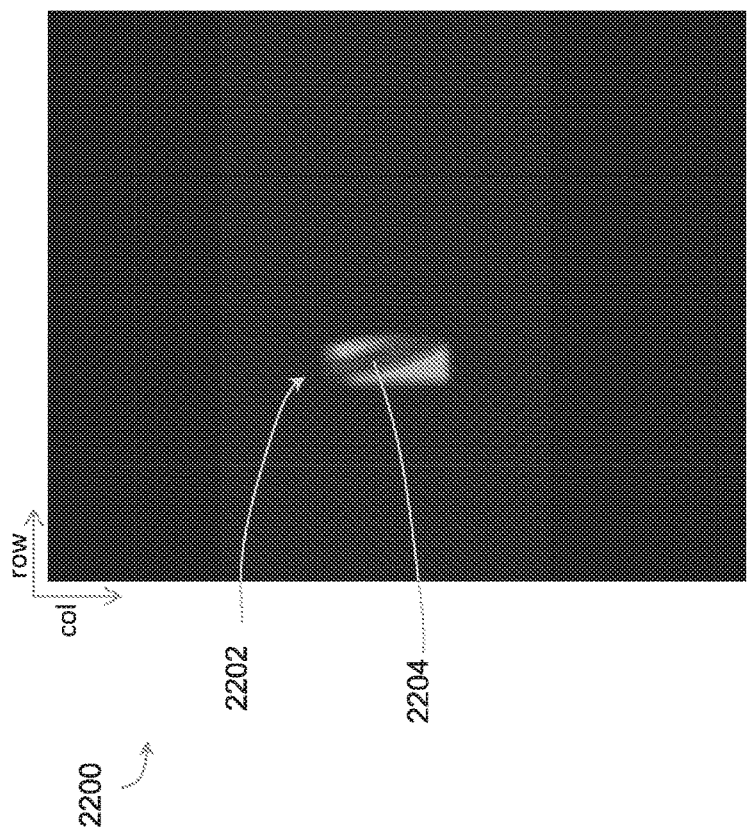
FIG. 22 is an example of a tightly collimated image.

The methods described herein may be useful to detect an x-ray beam. e.g., a "beam-on" event, impacting the pixels of the detector 2100. In one embodiment, the methods described herein may be useful to detect an x-ray beam used to capture a tightly collimated image of an object in DR detector 2100, such as illustrated in FIG. 22, wherein the image 2202 of the object 2204 is captured such that only a fraction of the total number of pixels in the image frame 2200 of DR detector 2100 receives x-rays. In order to detect an x-ray beam collimated into a fractional number of the total pixels in the detector, which capture fraction may appear anywhere in the array of imaging pixels, the methods disclosed hereunder may be performed to process the entire array of imaging pixels. Thus, while the description hereunder may refer to processing a subset of imaging pixels 2102, the method is performed repeatedly to process all subsets of imaging pixels 2104 in the DR detector 2100.

Figure 23A:
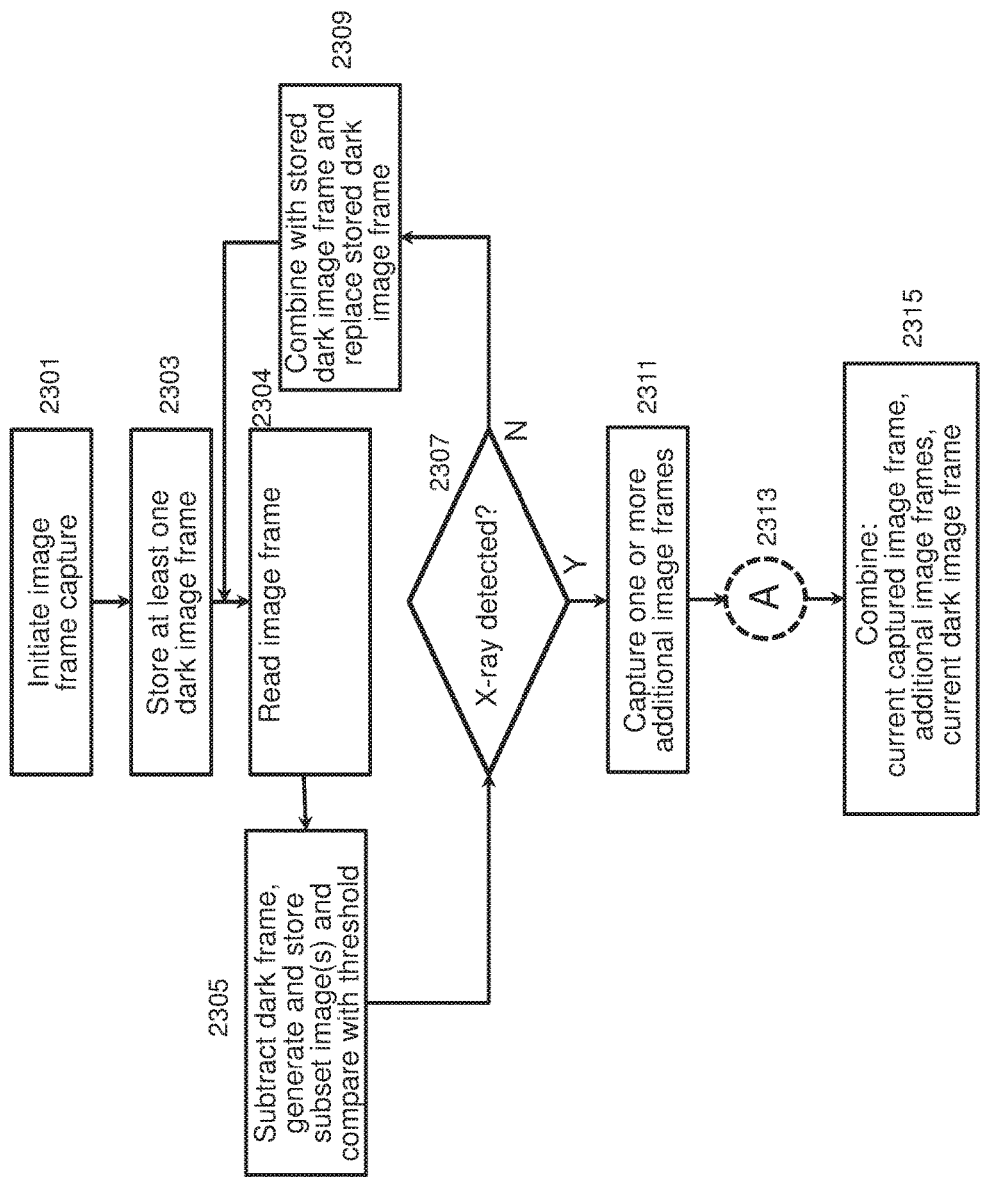
FIGS. 23A-23B are exemplary flow diagrams for operating a DR detector under program control.
Figure 23B:
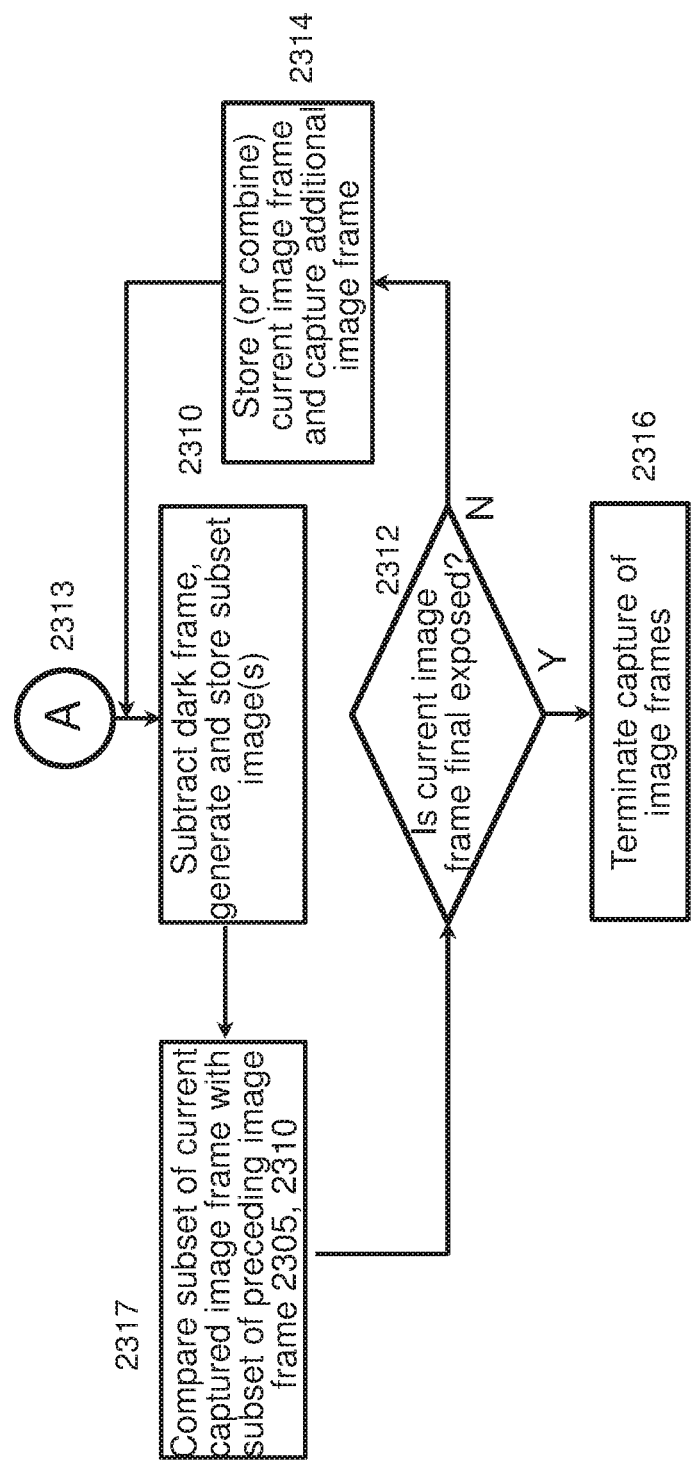

FIGS. 23A-23B are flowcharts illustrating exemplary methods of practicing embodiments of the present invention. The flowcharts of FIGS. 23A-23B may be computer implemented methods performed by programmed electronic circuits disposed in DR detector embodiments 40, 300 as disclosed herein, including a processor and associated FPGAs, and portions of the programmed method may be performed by a host processing system in wired or wireless communication with the electronic circuits disposed in the DR detector 2100.

With reference to the DR detector 2100 schematic having pixel addressing as shown in FIG. 21, and FIG. 23A, a step 2301 of the method may be initiated by a technician or other operator of the DR detector activating an image capture mode of the DR detector. At step 2301, sequential image frames are captured in the DR detector. In one embodiment, image frames are captured continuously, which capture rate is limited by a frame rate of the DR detector. The frame rate may be determined, at least in part, by an image integration time of the imaging pixels and an image readout time of the DR detector 2100. Prior to firing an x-ray source 14 toward the DR detector, the captured image frames may comprise one or more dark image frames. At step 2303, at least one captured dark image frame may be stored in a frame buffer in the DR detector. At step 2304 another image frame is captured in the DR detector 2100. This image is dark corrected, one or more subset or "strip" images are computed, and the strip image is compared with a predetermined threshold in a comparing step 2305. Based on the comparing step 2305, at step 2307, the detector 2100, or, alternatively, the host system 34, determines if the x-ray source 14 has been activated and its x-ray beam has reached the detector 2100. If, at step 2307, it is determined that the x-ray beam has not been detected, the current captured image frame is processed as a dark image frame, at step 2309, and is combined with the dark image frame already stored in the frame buffer, and the combined image frame is stored into the frame buffer, replacing the previous contents of the frame buffer. In one embodiment, image frames may be captured continuously and processed as one or more dark image frames prior to detecting the x-ray beam. In one embodiment, the one or more captured dark image frames may be combined into the one frame buffer by averaging the data intensity for each pixel in the frame as dark image frames are continuously captured. In one embodiment, a running average may be computed and stored in the frame buffer as an averaged dark image or, alternatively, a running weighted average may be computed utilizing any of a variety of weighting schemes for the combined series of captured dark image frames. After combining the current image frame into the frame buffer at step 2309, the method returns to step 2305. All processing between steps 2303 and steps 2311 can occur in real time as row by row of each image is processed. For example, the processor can read a row of image frame 2304, subtract the corresponding row of the dark frame buffer 2303, generate the subset image for the current row and compare with a threshold in step 2305.

If, based on the comparing step 2305, the x-ray beam is detected at step 2307, then one or more additional image frames and lag frames, are captured in the detector at step 2311. The number of additional image frames captured may be preprogrammed. The comparing step 2305 may include various modes of pixel intensity comparison to determine whether the detector 2100 has detected an x-ray beam, i.e., has captured an x-ray exposure image frame. In one embodiment, the step 2305 may compare the pixel intensity of each pixel in the subset image with a threshold and assert beam-on if any pixel value exceeded the threshold. In one embodiment, the step 2305 may compare each row of the subset image of the current captured image frame with the same row of the stored subset image of the stored dark image frame and establish the beam-on condition if any of the differences exceeded a predetermined threshold. In one embodiment, the step 2305 may compare a logical subset image with a threshold, whereby the logical subset image was formed by applying a threshold to a first subset image of the current dark-corrected captured image frame. For example, the pixel of secondary subset images receives an entry of 1 if the pixel value in the first subset image exceeds a preprogrammed threshold. Otherwise its logical value is zero. The beam-on condition is established if K consecutive rows of a column in the secondary strip image have entries of one. Preferred values for K are between 8 and 16. As described herein, captured image frames and the corresponding subset images may be stored in two or more frame buffers in the detector 2100. The dark image frame and the current captured image frame may be stored in separate frame buffers for performing a comparison under program control.

After step 2311, an alternative procedure 2313 may be programmably invoked, as described below. If the alternative procedure 2313 is not performed, then, at step 2315, the current captured image frame, the stored dark image frame, and the one or more additional image frames are combined at step 2315 to form an exposed radiographic image frame, which may be referred to as a projection image. In one embodiment, the step 2315 may include adding the current captured image frame to the one or more additional image frames to form a summation frame and then subtracting therefrom the stored dark image frame to form the exposed radiographic image frame, which, as described herein, may be a composite dark image frame formed from a combination of captured dark image frames. In one embodiment, the step 2315 may include real time subtraction of the stored dark image frame from each of the additional image frames and from the current captured image frame and adding the dark corrected current captured image frame to the one or more dark corrected additional image frames to form the exposed radiographic image frame. Again, this processing can be performed on the detector by the (FPGA in real time on a row by row basis.

An alternative embodiment of the presently disclosed method may further include a procedure 2313, or method, branching after step 2311, which may be programmably selected to execute, whereby, at step 2317 a pixel intensity of the subset image of the current captured image frame 2310 is compared with a pixel intensity of the same subset image of an immediately preceding captured image frame, either 2305 or 2310 of the previous image. At step 2312, in response to the compare step 2317, it may be determined that the current captured image frame is not a final image frame. If so, the current captured image frame may be stored and an additional image frame is captured at step 2314, and the method returns to step 2310. If, at step 2312, it is determined that the current captured image frame is a final image frame, then the capture of additional image frames is terminated at step 2316, and the process continues at step 2315, as described hereinabove, by combining the current captured image frame, the stored dark image frame and the one or more additional image frames using any of the methods as described above for step 2315. The comparing step 2317 may include various modes of comparison to determine whether the current image frame is a final image frame, i.e., all x-ray exposure information is contained in the current captured image frame and one or more preceding stored and/or combined image frames. In one embodiment, secondary subset images are used in step 2317 containing the row maximum of the primary subset images 2305 of the previous image capture and 2310 of the current image capture. In the first embodiment, condition 2312 (last image frame) is true if, for any row, the pixel value of the secondary subset image of the current image (2310) falls below a predetermined threshold and the pixel value of the secondary subset image of the previous image (2305 or 2310 of the previous frame) falls above the same predetermined threshold. In the second embodiment, condition 2312 (last image frame) is true if, for any row, the pixel value of the secondary subset image of the current image (2310) is less than a predetermined fraction (below one) of the pixel value of the secondary subset image of the previous image (2305 or 2310 of the previous frame). In another embodiment, the stored subset images of the dark-corrected null frames are used in addition to identify the last frame containing exposure information in steps 2317 and 2312. In this embodiment, the average intensities of the pixel subsets shown in FIG. 21 are calculated on a row by row basis, and only the maximum of all row values is stored for each frame. If the maximum pixel value of the subset null image of the previous null frame is above a predetermined threshold and maximum pixel value of the subset null image of the current null frame is above a predetermined fraction (below 1) of the previous subset null image, the next and not the current image frame is the last frame containing exposure information. This information is particularly useful if any analysis of the subset images of the image frames misidentified the current frame as the last frame with exposure information. Likewise, analysis of the subset images of the image frames may miss that the current frame is the last frame containing exposure information. In this case, the current frame can be identified correctly as the last frame if the maximum pixel value of the subset null image of the previous null frame is above a predetermined threshold and maximum pixel value of the subset null image of the current null frame is below a predetermined fraction (below 1) of the previous subset null image. The embodiments of beam-on and beam-off detection discussed in this section show that secondary and tertiary subset images can be derived from the primary subset images according to FIG. 21 using various statistical measures, e.g., maxima, means and logical arrays. These reduced data sets can be calculated for image frames and null frames. These reduced data sets increase the computational efficiency of the beam-on and beam-off detection algorithms and reduce the amount of storage needed.

The following section shows an algorithm for the beam on/off detection procedure which may be programmed on an image processor, e.g. FPGA. The detector is initialized for beam-on detection by capturing at least i+1 dark images, with i≥1, calculating a dark average of the captured images, and maintaining a cumulative dark average by weighting each new captured dark image with a current cumulative average according to the equations shown below. In one embodiment, i=4, for calculating an initial cumulative dark average. As explained herein, each line (row) of each image frame is read out with the gate line on (image capture) and the gate line off (null image capture). Separate cumulative dark averages are maintained for the dark images and the null images while the detector is ready for beam detection and exposure image captures. It may also be advantageous to maintain a running dark average, rather than a cumulative average. If frame j is identified as having no image content in step 2307, weighted averages $O_{i,j}$ and $O_{n,j}$ are calculated between the current dark average $O_{i,j-1}$ and $O_{n,j-1}$, and new dark images $D_{i,j}$ and $D_{n,j}$ according to the following equations (the indices i and n refer to the image and the null image):

$$O_{i,k} = w \cdot D_{i,k} + (1-w) \cdot O_{i,k-1}$$

$$O_{n1,k} = w \cdot D_{n1,k} + (1-w) \cdot O_{n1,k-1}$$

where the weighting factor w is between 0 and 1. In one embodiment, w=0.2, which may be useful in the embodiment where a running average of four images is maintained.

With reference to FIGS. 21 and 23A-23B, as each row of the image is read out the dark average may be subtracted from each pixel. Each dark corrected row k is divided into m=1 . . . M blocks, which are N pixels wide. The average captured intensity $A_{m,k}$ over N pixels in each block is calculated and stored. If for any block m, the average for the current row and the preceding K−1 rows These reduced data sets increase the computational efficiency of the beam-on and beam-off detection algorithms and reduce the amount of storage needed.

The following section shows an algorithm for the beam on/off detection procedure which may be programmed on an image processor, e.g. FPGA. The detector is initialized for beam-on detection by capturing at least i+1 dark images, with i≥1, calculating a dark average of the captured images, and maintaining a cumulative dark average by weighting each new captured dark image with a current cumulative average according to the equations shown below. In one embodiment, i=4, for calculating an initial cumulative dark average. As explained herein, each line (row) of each image frame is read out with the gate line on (image capture) and the gate line off (null image capture). Separate cumulative dark averages are maintained for the dark images and the null images while the detector is ready for beam detection and exposure image captures.

It may also be advantageous to maintain a running dark average, rather than a cumulative average. If frame j is identified as having no image content in step 2307, weighted averages $O_{i,j}$ and $O_{n,j}$ are calculated between the current dark average $O_{i,j-1}$ and $O_{n,j-1}$, and new dark images $D_{i,j}$ and $D_{n,j}$ according to the following equations (the indices i and n refer to the image and the null image):

$$O_{i,k} = w \cdot D_{i,k} + (1-w) \cdot O_{i,k-1}$$

$$O_{n1,k} = w \cdot D_{n1,k} + (1-w) \cdot O_{n1,k-1}$$

where the weighting factor w is between 0 and 1. In one embodiment, w=0.2, which may be useful in the embodiment where a running average of four images is maintained.

With reference to FIGS. 21 and 23A-23B, as each row of the image is read out the dark average may be subtracted from each pixel. Each dark corrected row k is divided into m=1 ... M blocks, which are N pixels wide. The average captured intensity $A_{m,k}$ over N pixels in each block is calculated and stored. If for any block m, the average for the current row and the preceding K-1 rows exceeds a predetermined threshold, the beam on condition is established. Typical examples are K=8, M=5 and N=512. The section of K rows by N pixels is referred to as a subset of pixels as illustrated in FIG. 21. In the example, the average of several subgroups of pixels, namely the average over 512 columns for each row, is compared with the threshold, and depending on the outcome of the comparison, a bit is set for each of the 8 rows. The logical AND combination of the results for all 8 rows provides the final decision criterion, i.e. statistical measure, for beam on detection. The preferred threshold for a 16 bit system is between 8 and 25. Thresholds may be based on the expected noise of the block row averages.

The methods disclosed herein solve the problem of detecting an x-ray beam-on in a tight collimation radiographic image as illustrated in FIG. 22. By examining such an image row by row and block by block, the method is not sensitive to where the collimated area is located in the array of imaging pixels. This is advantageous when compared with some hardware driven methods of beam detection, which only work when the collimator open area is centered. Moreover, embodiments described herein may be robust against excessive row noise, the exemplary sources of which are explained herein, and detector defects by requiring eight consecutive rows of a single block to be measured above threshold.

In another embodiment, the dark-corrected image and null image may be used for a robust detection of the beam-off condition, or event. The beam-off algorithm detects the last frame, or final frame, with exposure information, which is one frame after the actual beam-off event. This is accomplished by comparing smoothed block row averages of a pixel subset in a current captured frame with the same pixel subset in an immediately preceding frame. The beam-off detection algorithm may include the steps as described hereinbelow.

(1) After the beam-on event is detected, continue calculating the dark-corrected row averages for the M blocks, or strips (in reference to a row of one block length). For each row k, average the result for the current row and the preceding K-1 rows. The result is M $A_{m,k}$ values. For each row store the maximum of all $A_{m,k}$ as $A_k$. At the end of the frame save all $A_k$ values to a buffer $A_{k0}$ and save the maximum of all $A_{k0}$ values to $A_{k0max}$.

(2) After the beam-on event, for each row k, calculate the dark-corrected row averages for the M strips of the null image. For each row k, average the result for the current row and the preceding K-1 rows. The result is M $AN_{m,k}$ values. For each row store the maximum of all $AN_{m,k}$ as $AN_k$. While running through the rows update the maximum $AN_{max}$ of all stored $AN_k$ values. At the end of the frame save the maximum of all $AN_k$ values to a $AN_{j,max}$, where j is the frame index.

Repeat steps (1) and (2) for each frame until the last frame with exposure information has been found. Once $A_k$ has been calculated for row k according to step (1) and $AN_{max}$ has been updated according to step (2), perform the following programmed comparisons:

--- if ($A_{k0} > t_{off,hi}$ AND $A_k < t_s \cdot A_{k0}$) OR ($A_{k0} \geq t_{on}$ AND $A_k < t_{on}$ {
  if ($AN_{j,max} > t_{on}$ AND $AN_{j,max} > t_n \cdot AN_{j-1,max}$)
    last exposed frame = frame j +1 (current frame +1)
  else
    last exposed frame = frame j (current frame)}
}
else {
  if $AN_{j-1,max} > t_{off\_hi}$ AND $AN_{j,max} \leq t_n \cdot AN_{j-1,max}$
  {last exposed frame = frame j (current frame)}
},

--- where j is the frame index. The outer if condition compares the current image frame with the previous frame. The inner if condition uses additional information from the null images to refine the result. Preferred settings of the threshold levels $t_{off,hi}$, $t_n$, and $t_s$ for 16 bit processing systems are $t_{off,hi}$=64, $t_n$=0.25 and $t_s$=0.125. $AN_{j-1,max}$ and $AN_{j,max}$ come from step (2), for the previous and the current frame, respectively. The algorithm is robust against differences in collimation, noise and defects by using the block with the highest signal in the comparison of the current and the previous frame and by averaging the strip row means over a selected number of adjacent rows.

The algorithm is robust against differences in collimation, noise and defects by using the block with the highest signal in the comparison of the current and the previous frame and by averaging the strip row means over a selected number of adjacent rows.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "circuitry," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of operating a digital radiographic detector, the method comprising:
    capturing image frames in the detector including capturing at least one dark image frame in the detector and storing a dark image frame in the detector;
    detecting an x-ray beam impacting the detector, wherein the step of detecting an x-ray beam comprises:
        comparing a statistical measure for a subset of pixels in a current captured image frame with the same statistical measure of a subset of pixels in the stored dark image frame; and
        in response to the step of comparing, determining that the current captured image frame is an x-ray exposure image frame;
    capturing at least one more image frame in the detector after the step of detecting an x-ray beam;
    adding the current captured image frame and the at least one more image frame; and
    subtracting the stored dark image frame, to form an exposed image frame.

2. The method of claim 1, wherein the step of comparing comprises determining that a pixel intensity difference threshold between the subsets of pixels is exceeded.

3. The method of claim 2, further comprising selecting the subsets of pixels to consist of the same subset of consecutive columns of pixels and the same subset of consecutive rows of pixels and storing at least one statistical measure for each subset of pixels.

4. The method of claim 3, wherein the step of comparing further comprises comparing an average intensity of each row of the subset of pixels in the current captured image frame with an average intensity of the same row of the subset of pixels in the stored dark image frame.

5. The method of claim 4, wherein the step of comparing further comprises comparing a portion of, or the entirety of, an array of statistical measures for the subset of pixels in the current captured image frame with a threshold to form another array of statistical measures of the same portion of, or the entirety of, the subset of pixels for the current captured image.

6. The method of claim 3, wherein the step of comparing further comprises comparing an average intensity of the subset of pixels in the current captured image frame with an average intensity of the subset of pixels in the stored dark image frame.

7. The method of claim 3, wherein the step of capturing image frames further comprises capturing a continuous sequence of image frames at a frame rate of the detector.

8. The method of claim 7, further comprising integrating an x-ray beam during an integration period and reading out the integrated x-ray beam during a readout period, wherein the integration period and the readout period determine the frame rate.

9. The method of claim 1, wherein the step of capturing image frames further comprises capturing a plurality of dark image frames in the detector, and the step of storing a dark image frame comprises computing and storing an average of the plurality of captured dark image frames.

10. The method of claim 9, wherein the step of comparing further comprises comparing a statistical measure for each row of the subset of pixels in the current captured image frame with a statistical measure for the same row of the subset of pixels in the stored dark image frame.

11. A digital radiographic detector comprising:
an on-board image processing unit storing instructions which, when executed, cause the DR detector to perform the steps of claim 1.

12. A method of operating a digital radiographic detector, the method comprising:
capturing image frames in the detector including capturing at least one dark image frame in the detector and storing an average dark image frame in the detector;
detecting an x-ray beam impacting the detector, wherein the step of detecting an x-ray beam comprises:
comparing a statistical measure for a subset of pixels in a current captured image frame with the same statistical measure for a subset of pixels in the stored dark image frame; and
in response to the step of comparing, determining that the current captured image frame is an x-ray exposure image frame comprising exposure information;
continuously capturing image frames having exposure information in the detector after the step of detecting the x-ray beam;
detecting a final image frame containing exposure information, the step of detecting the final image frame comprising:
comparing an intensity of a subset of pixels in a current captured image frame with an intensity of the same subset of pixels in an immediately preceding captured image frame; and
in response to determining that an intensity difference between the subsets of pixels falls below a predetermined threshold, further determining that the current captured image frame is the final image frame containing exposure information;
adding all image frames containing exposure information; and
dark correcting the added image frames by subtracting the average dark image frame to form an exposed image frame.

13. The method of claim 12, further comprising calculating a weighted average of a previous average dark image frame and a current dark image frame to determine the average dark image frame.

14. The method of claim 13, wherein the step of comparing the intensity of the subsets of pixels comprises comparing an average intensity of each row of the subset of pixels in the current captured image frame with an average intensity of the same row of the subset of pixels in the immediately preceding captured image frame.

15. The method of claim 14, wherein the step of comparing the intensity of the subsets of pixels further comprises comparing a dark corrected average intensity of each row of the subset of pixels in the current captured image frame with a dark corrected average intensity of the same row of the subset of pixels in the immediately preceding captured image frame.

16. The method of claim 15, further comprising determining if the dark corrected average intensity of the subset of pixels in the immediately preceding captured image frame falls above a predetermined threshold.

17. The method of claim 16, further comprising terminating the step of continuously capturing image frames if the dark corrected average intensity of the subset of pixels in the captured image frame falls above a predetermined threshold.

18. The method of claim 12, further comprising terminating the step of continuously capturing image frames in response to detecting the final image frame containing exposure information.

19. The method of claim 18, where the step of continuously capturing image frames is terminated when the average intensity of the subset of pixels in the captured image frame falls below a predetermined fraction of the same subset of pixels in the immediately preceding image frame.

* * * * *